US012151505B2

(12) United States Patent
Matsuda et al.

(10) Patent No.: US 12,151,505 B2
(45) Date of Patent: Nov. 26, 2024

(54) ENVELOPE PROCESSING APPARATUS AND IMAGE FORMING SYSTEM

(71) Applicants: Takahiro Matsuda, Kanagawa (JP); Michitaka Suzuki, Kanagawa (JP); Nobuyoshi Suzuki, Tokyo (JP); Yuusuke Shibasaki, Tokyo (JP); Atsushi Shinoda, Kanagawa (JP); Shingo Yoshizawa, Kanagawa (JP); Takahiro Watanabe, Kanagawa (JP); Takuya Morinaga, Tokyo (JP)

(72) Inventors: Takahiro Matsuda, Kanagawa (JP); Michitaka Suzuki, Kanagawa (JP); Nobuyoshi Suzuki, Tokyo (JP); Yuusuke Shibasaki, Tokyo (JP); Atsushi Shinoda, Kanagawa (JP); Shingo Yoshizawa, Kanagawa (JP); Takahiro Watanabe, Kanagawa (JP); Takuya Morinaga, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 25 days.

(21) Appl. No.: 18/174,919

(22) Filed: Feb. 27, 2023

(65) Prior Publication Data

US 2023/0311561 A1 Oct. 5, 2023

(30) Foreign Application Priority Data

Feb. 28, 2022 (JP) ................................ 2022-030062

(51) Int. Cl.

| | |
|---|---|
| ***B43M 3/04*** | (2006.01) |
| ***B41J 3/28*** | (2006.01) |
| ***G03G 15/00*** | (2006.01) |

(52) U.S. Cl.
CPC ................ *B43M 3/045* (2013.01); *B41J 3/28* (2013.01); *G03G 15/65* (2013.01); *G03G 2215/00514* (2013.01)

(58) Field of Classification Search
CPC ........ B43M 3/045; B43M 5/02; B43M 3/042; G03G 15/6582
(Continued)

(56) References Cited

U.S. PATENT DOCUMENTS 6,164,046 A * 12/2000 Werner .................. B43M 3/045 53/284.3
6,751,930 B1 * 6/2004 Werner .................. B43M 3/045 53/284.3
(Continued)

FOREIGN PATENT DOCUMENTS

JP 2012-106857 6/2012
JP 2012-232831 11/2012

*Primary Examiner* — Jacob A Smith
(74) *Attorney, Agent, or Firm* — IPUSA, PLLC

(57) ABSTRACT

An envelope processing apparatus inserts an enclosure into an envelope and includes a first conveyor, a first ejector, a second conveyor, a second ejector, and circuitry. The first conveyor conveys the enclosure to an enclosing position. The envelope in which the enclosure is enclosed is ejected to the first ejector. The second conveyor conveys the envelope to the enclosing position via an envelope conveyance passage extended in a substantially vertical and up-and-down direction and conveys the envelope in which the enclosure is inserted to the first ejector. The second ejector is separate from the first ejector. The enclosure is ejected to the second ejector. The circuitry controls a conveyance operation of the first conveyor and the second conveyor.

12 Claims, 23 Drawing Sheets

(58) Field of Classification Search
USPC ..................................................... 53/569, 255
See application file for complete search history.

(56) References Cited

U.S. PATENT DOCUMENTS

| | | | | |
|---|---|---|---|---|
| 2004/0250517 | A1* | 12/2004 | Hsieh | B43M 3/045 53/284.3 |
| 2007/0069448 | A1* | 3/2007 | Honda | B65H 31/10 271/145 |
| 2012/0192529 | A1* | 8/2012 | Sytema | B65H 39/043 53/469 |
| 2012/0260606 | A1* | 10/2012 | Noguchi | G03G 15/6594 53/255 |
| 2016/0026411 | A1* | 1/2016 | Nishihata | B65H 45/142 358/1.12 |
| 2019/0299667 | A1* | 10/2019 | Furumido | B65H 31/3027 |
| 2021/0279538 | A1* | 9/2021 | Suzuki | G06K 15/102 |

* cited by examiner

ENVELOPE PROCESSING APPARATUS AND IMAGE FORMING SYSTEM

CROSS-REFERENCE TO RELATED APPLICATION

This patent application is based on and claims priority pursuant to 35 U.S.C. § 119(a) to Japanese Patent Application No. 2022-030062, filed on Feb. 28, 2022, in the Japan Patent Office, the entire disclosure of which is hereby incorporated by reference herein.

BACKGROUND

Technical Field

Embodiments of the present disclosure relate to an envelope processing apparatus and an image forming system.

Related Art

An envelope processing apparatus is known that inserts an enclosure into an envelope and seals the envelope in which the enclosure is inserted. An image forming system is also known that includes an image forming apparatus to form an image on a sheet, and the envelope processing apparatus to enclose the sheet on which the image is formed as an enclosure into the envelope and to seal the envelope in which the enclosure is inserted.

SUMMARY

In an embodiment of the present disclosure, there is provided an envelope processing apparatus that inserts an enclosure into an envelope and includes a first conveyor, a first ejector, a second conveyor, a second ejector, and circuitry. The first conveyor conveys the enclosure to an enclosing position. The envelope in which the enclosure is enclosed is ejected to the first ejector. The second conveyor conveys the envelope to the enclosing position via an envelope conveyance passage extended in a substantially vertical and up-and-down direction and conveys the envelope in which the enclosure is inserted to the first ejector. The second ejector is separate from the first ejector. The enclosure is ejected to the second ejector. The circuitry controls a conveyance operation of the first conveyor and the second conveyor.

In another embodiment of the present disclosure, there is provided an image forming system that includes an image forming apparatus to form an image onto a sheet-shaped medium and the envelope processing apparatus.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
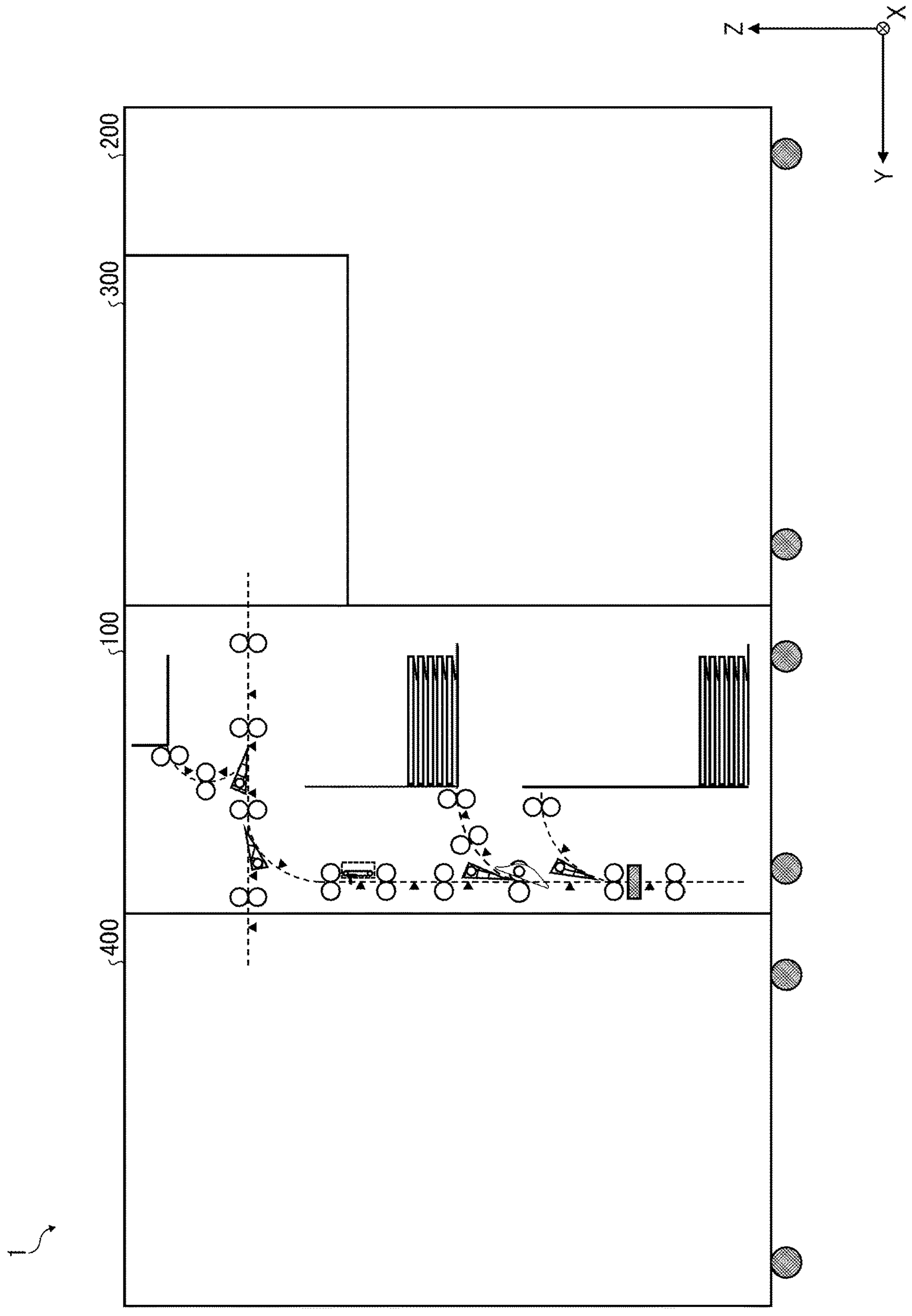
FIG. 1 is a front external view of an enclosing system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

First, an embodiment of the present disclosure is described below. FIG. 1 is a front external view of a print system 1 as an example of an image forming system according to an embodiment of the present disclosure. The print system 1 includes an image forming apparatus 200, a folding apparatus 300 as a sheet processing apparatus that performs folding processing, an envelope processing apparatus 100 according to an embodiment of the present disclosure that encloses and seals an enclosure, and a post-processing apparatus 400. The print system 1 is also an image forming system according to an embodiment of the present disclosure.

The image forming apparatus 200 is an apparatus that forms an image on a sheet-shaped medium by a specified image forming method and ejects the sheet-shaped medium. The sheet-shaped medium on which the image is formed (hereinafter, simply referred to as a "sheet S") is ejected to the folding apparatus 300.

The folding apparatus 300 performs folding processing on the sheet S ejected from the image forming apparatus 200 based on a setting according to a specified folding type and folding dimension, forms a folded sheet Sf, and ejects the folded sheet Sf. The folding apparatus 300 may eject the sheet S downstream as it is, based on a setting. A setting related to performing or non-performing of the folding processing or a setting used for execution of the folding processing are based on setting information (various adjustment values) notified from the image forming apparatus 200. A mechanism that performs the folding processing adjusts a feed amount of the sheet S based on various adjustment values, forms a crease at a folding position in accordance with the adjustment, and forms the folded sheet Sf. The folded sheet Sf on which the specified folding processing is performed is sent out to the envelope processing apparatus 100.

The folding apparatus 300 performs processing for adjusting a folding dimension so that a trailing end of the folded sheet Sf in an insertion direction when the folded sheet Sf is inserted into the envelope E in the envelope processing apparatus 100 turns to be the "crease" of the folded sheet Sf.

The envelope processing apparatus 100 performs enclosing processing. In the enclosing processing, the folded sheet Sf, which is conveyed after the folding processing is performed in an apparatus (folding apparatus 300) disposed upstream in an entry direction of the sheet S, or the sheet S on which the folding processing is not performed is inserted and enclosed into the envelope E. The envelope processing apparatus 100 also performs sealing processing for sealing the envelope E in which the folded sheet Sf or the sheet S, or both, are inserted. The envelope processing apparatus 100 can convey the folded sheet Sf or the sheet S downstream without enclosing the folded sheet Sf or the sheet S into the envelope E. In this case, the folded sheet Sf or the sheet S is sent out to the post-processing apparatus 400 disposed downstream from the envelope processing apparatus 100. The post-processing apparatus 400 is an apparatus that performs post-processing such as staple processing on the conveyed sheet S.

The envelope processing apparatus 100 performs conveyance processing for enclosing the folded sheet Sf, on which the folding processing has performed, into the envelope E in an appropriate orientation. The envelope processing apparatus 100 also performs processing of adjusting the orientation of the folded sheet Sf in enclosing the folded sheet Sf so that information such as an address formed on the enclosed folded sheet Sf is located at a position where the information can be visually recognized through a transparent window ew formed on the envelope E in advance. This adjustment processing is performed by reversal conveyance processing included in the conveyance processing. Accordingly, the envelope processing apparatus 100 determines whether the orientation of the folded sheet Sf at the time of enclosure is to be reversed from the orientation at the time of entry, based on an image position of the folded sheet Sf at the time of entry and the position of the transparent window ew formed in the envelope E. Then, the conveyance processing and the reversal conveyance processing are performed based on the determination result.

With reference to FIG. 1, a description is given of a "direction" commonly used in the description of embodiments of the present disclosure. As illustrated in FIG. 1, an axis parallel to a placement surface of the print system 1 is defined as a Y axis. An arrangement direction of the apparatuses constituting the print system 1 is along the Y axis. Thus, as illustrated in FIG. 1, an arrow direction of the Y axis is defined as a Y direction. The sheet S on which an image is formed in the image forming apparatus 200 is conveyed in the Y direction, and then conveyed to each apparatus disposed downstream from the image forming apparatus 200 in the Y direction.

Similarly, an axis parallel to the placement surface and orthogonal to the Y axis is defined as an X axis. A depth direction of the print system 1 is an arrow direction of the X axis and is defined as an X direction. An arrow direction of a Z axis orthogonal to the X axis and the Y axis and corresponding to a height direction of the print system 1 is defined as a Z direction. As illustrated in FIG. 1, the envelope processing apparatus 100 has a configuration of conveying an enclosure to a position at which the enclosure is inserted into the envelope E, a configuration for enclosing the enclosure, and a configuration for sealing the envelope E, which are arranged side by side in the Z direction. Thus, the plane dimension of the envelope processing apparatus 100 can be downsized and the envelope processing apparatus 100 available even in narrow installation space can be achieved. Also in the following drawings, the same axes are denoted, and the description of the axes is omitted.

Figure 2:
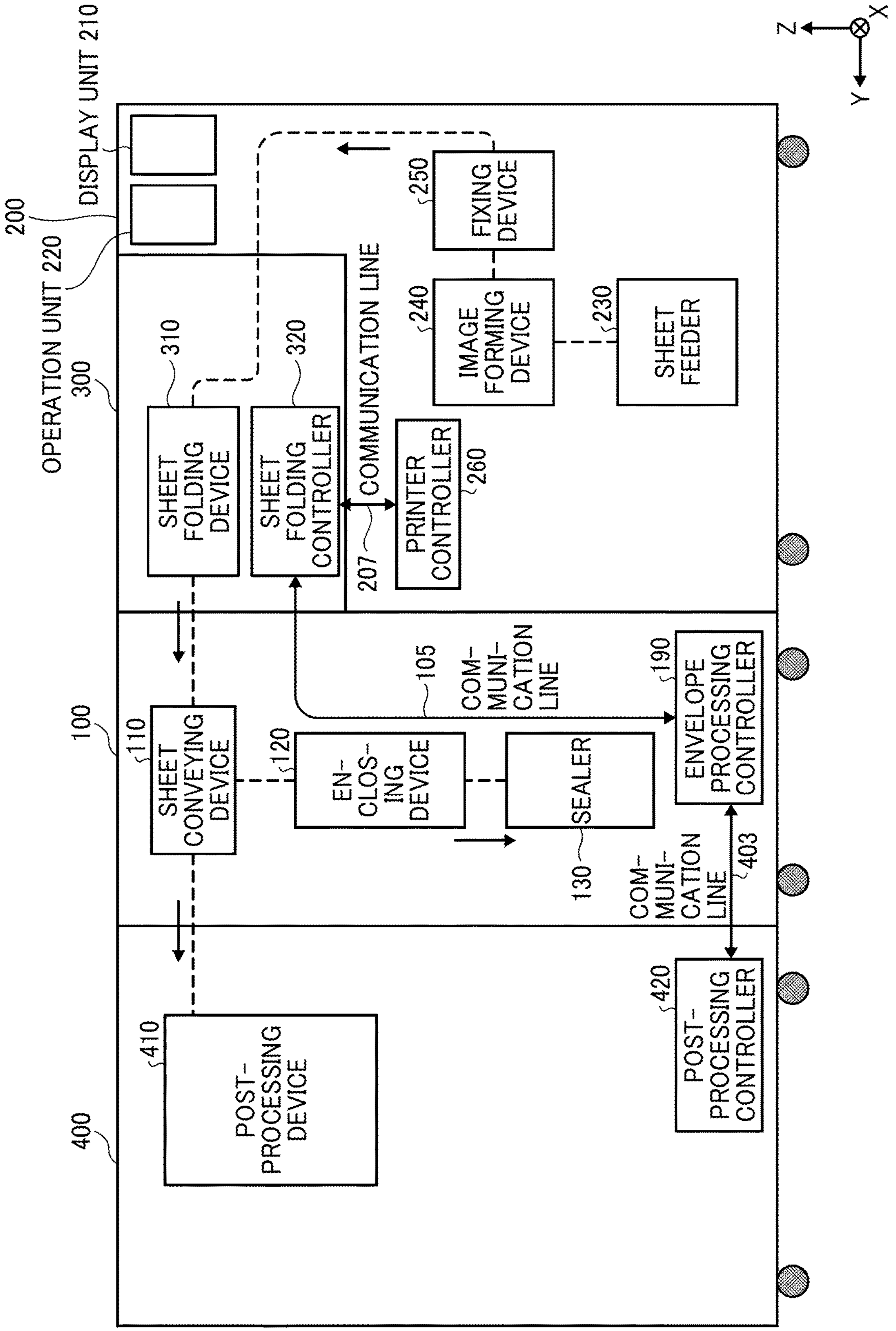
FIG. 2 is a block diagram illustrating a control configuration of the enclosing system of FIG. 1.

With reference to FIG. 2, a description is given of overall functional blocks of the print system 1. In the following descriptions, an enclosing target as a medium that is conveyed, and inserted and enclosed in the envelope E is a folded sheet Sf on which an image is formed in the image forming apparatus 200 and on which specified folding processing is performed in the folding apparatus 300. In FIG. 2, movement passages (conveyance passages) of the sheet S and the folded sheet Sf are indicated by dashed lines, and communication lines used for transmitting and receiving signals between functional blocks are indicated by solid lines.

The image forming apparatus 200 is, for example, an apparatus that forms an image on a sheet S by a known electrophotographic process. The image forming apparatus

200 includes a display unit 210, an operation unit 220, a sheet feeder 230, an image forming device 240, a fixing device 250, and a printer controller 260. Note that the image forming process in the image forming apparatus 200 is not limited to an electrophotographic process and may be an inkjet process in which liquid ink is discharged onto a medium to form an image. In addition, any other suitable process than the above-described image forming process may be used.

The display unit 210 displays screens for notifying a user of states of various functions and operation contents. The operation unit 220 corresponds to an operation interface with which the user performs setting a processing operation mode or the number of prints to be processed.

The operations performed via the operation unit 220 include, for example, the setting of the type of folding operation (folding type) or the folding dimension to be performed in the folding apparatus 300, and the setting of requiring reverse conveyance when the sheet S is enclosed in the envelope processing apparatus 100. Information on the settings performed via the operation unit 220 is transmitted from the printer controller 260 to a sheet folding controller 320 or an envelope processing controller 190.

The sheet feeder 230 includes a sheet feeding mechanism that stores sheets S, and separates and feeds the sheets S one by one. The image forming device 240 forms a latent image on a photoconductor and transfers an image onto the sheet S. The fixing device 250 fixes the image transferred onto the sheet S. The printer controller 260 controls operations of the above-described functional blocks.

The folding apparatus 300 includes a sheet folding device 310 and the sheet folding controller 320 that controls the entire folding apparatus 300. The sheet folding controller 320 controls folding processing for the sheet S based on a folding type (folding manner) and a folding dimension designated from the printer controller 260 of the image forming apparatus 200 via a communication line 207. The sheet folding controller 320 also controls communication with the printer controller 260, and the envelope processing controller 190 connected downstream from the sheet folding controller 320. The sheet folding device 310 performs folding processing on the sheet S conveyed from the image forming apparatus 200 with the designated folding type (folding manner) and the designated folding dimension, based on control of the sheet folding controller 320. Note that the sheet S may be conveyed to the envelope processing apparatus 100 without being folded in the sheet folding device 310.

Returning to FIG. 2, a description is given below. The envelope processing apparatus 100 includes a sheet conveying device 110 serving as a first conveyor, an enclosing device 120 and a sealer 130 serving as a second conveyor, and an envelope processing controller 190. The envelope processing controller 190 serves as a controller that controls operations of the sheet conveying device 110, the enclosing device 120, and the sealer 130.

The sheet conveying device 110 performs the conveyance processing for conveying the sheet S and the folded sheet Sf conveyed from the image forming apparatus 200 and the folding apparatus 300 as the upstream apparatuses to the post-processing apparatus 400 as the downstream apparatus or to the enclosing device 120. The sheet conveying device 110 performs specified processing in accordance with control modes (including, for example, a type of conveyed medium, a type of folding manner in the case of the folded sheet Sf, a folding dimension, and a position of the image forming surface Ps) transmitted from the upstream apparatus to the envelope processing controller 190. The control modes are transmitted from the printer controller 260 and the sheet folding controller 320 to the envelope processing controller 190 via a communication line 105.

Hereinafter, the sheet S or the folded sheet Sf, or both, conveyed from the upstream apparatus and conveyed in the envelope processing apparatus 100 may be collectively referred to as a conveyance object.

The enclosing device 120 moves the conveyance object to a position where the conveyance object can be enclosed in the envelope E. Then, the enclosing device 120 holds the moved envelope E so that the flap ef is opened and the conveyance object can be enclosed (inserted). After the conveyance object is inserted into the envelope E whose flap ef is open, the sealing processing is performed to push in the conveyance object and sealed.

The sealer 130 performs the sealing processing for closing the flap ef in the course of conveyance of the envelope E in which the conveyance object is enclosed to an ejection tray 137. The sealed envelope E is ejected to the ejection tray 137. That is, the sealer 130 includes a flap closing section to close an open flap and conveys the envelope E to the ejection tray 137.

The envelope processing controller 190 controls operations of a plurality of conveying rollers and a plurality of switching claws constituting the sheet conveying device 110, the enclosing device 120, and the sealer 130. The envelope processing controller 190 receives information of the conveyance object (hereinafter, referred to as "enclosing target information") from the printer controller 260 and the sheet folding controller 320, and performs control processing on the conveyance object based on the received information.

The envelope processing controller 190 acquires a detection signal from a conveyance sensor disposed between the plurality of conveying rollers and performs processing for specifying the position of the envelope E or the enclosure on each conveyance passage. The envelope processing controller 190 performs processing for determining, based on a detection signal from the conveyance sensor, whether the conveyance of the envelope E or the conveyance object on the conveyance passage is in a normal conveyance state or an abnormal conveyance state (a condition different from the normal conveyance state, such as conveyance clogging and stagnation due to sheet slippage). When the envelope processing controller 190 determines that the conveyance state is abnormal, the envelope processing controller 190 controls a purge conveyance operation described below.

The post-processing apparatus 400 includes a post-processing device 410 and a post-processing controller 420. The post-processing device 410 executes specified post-processing on the sheet S conveyed from the upstream side under the control of the post-processing controller 420. The post-processing controller 420 controls the post-processing operation in the post-processing controller 420 according to the operation mode transmitted from the printer controller 260, the sheet folding controller 320, and the envelope processing controller 190 through a communication line 403.

The printer controller 260, the sheet folding controller 320, the envelope processing controller 190, and the post-processing controller 420 are connected to each other, and exchange information necessary for control through the communication lines 207, 105, and 403. The controllers 260, 320, 190, and 420 cooperate with each other to share, for example, the sheet size and information on the processing mode that the user request to perform on the conveyance object. Accordingly, the entirety of the print system 1 shares control information on which each of the mechanisms described above can perform specified processing with specified timing and a specified process. Accordingly, a sealing-state adjustor as a unit for adjusting the sealing state to be described below is constituted by cooperation of the controllers 260, 320, 190, and 420.

In FIGS. 1 and 2, an example in which the post-processing apparatus 400 is coupled to the downstream side of the envelope processing apparatus 100 is illustrated as an example of the configuration of the print system 1. Typical examples of the post-processing apparatus 400 include a finisher that performs stapling processing, a stacker, or a bookbinding machine. The system configuration of the print system 1 may be such a configuration in which the envelope processing apparatus 100 is located on the most downstream side.

Figure 3:
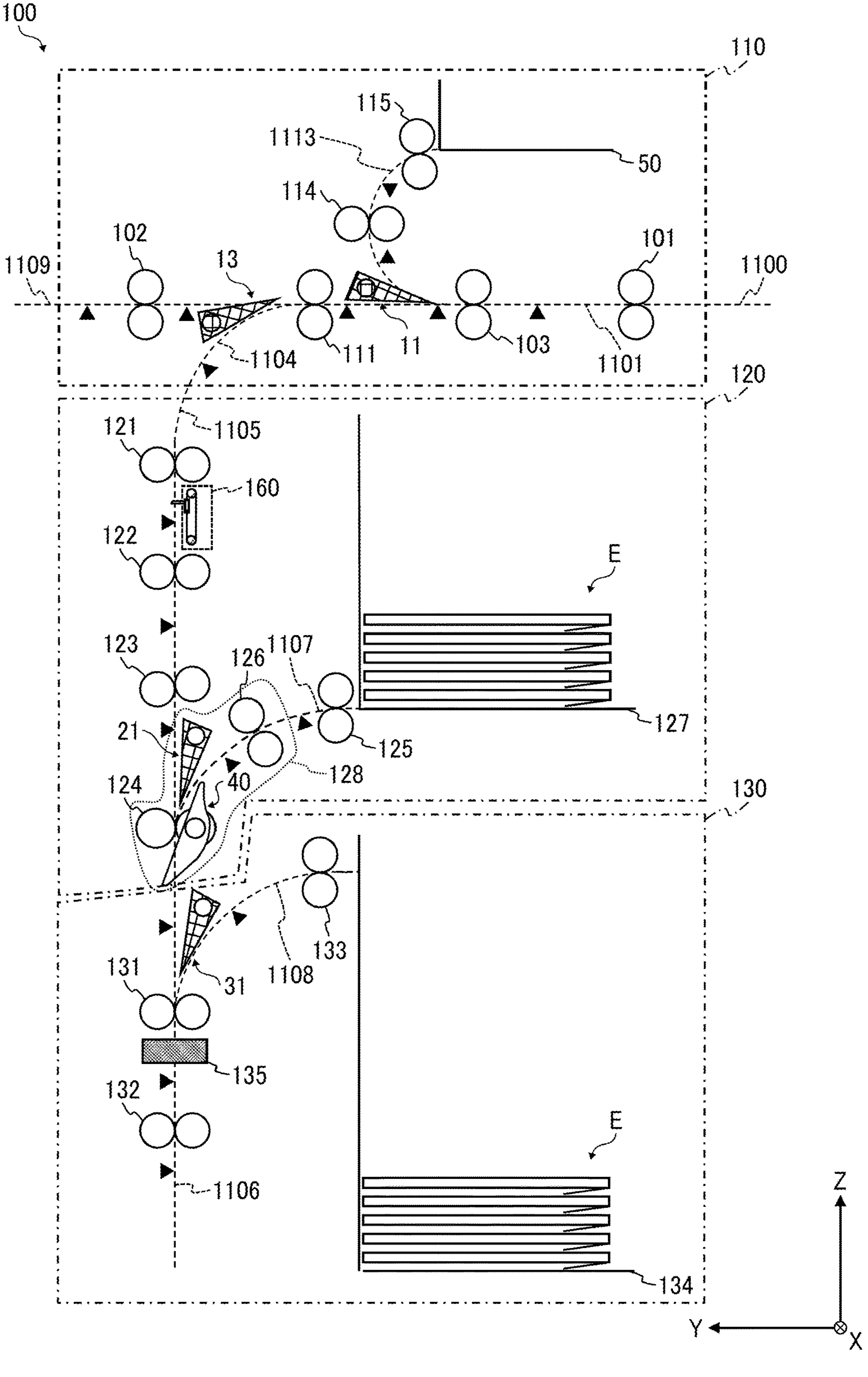
FIG. 3 is a diagram illustrating an internal configuration of an envelope processing apparatus according to an embodiment of the present disclosure.

Next, a description is given of conveying roller pairs constituting the sheet conveying device 110, the enclosing device 120, a flap opening mechanism 128, and the sealer 130 disposed in the envelope processing apparatus 100, switching claws that switch the conveyance direction of a conveyance object, and conveyance passages on which these components are arranged with reference to FIG. 3. The envelope processing apparatus 100 conveys a conveyance object by each conveying roller pair. A plurality of sensors for detecting the position of the conveyance object on the conveyance passage are disposed at respective positions between the conveying roller pairs. Note that the plurality of sensors are indicated by black triangles in FIG. 3. In FIG. 3 and subsequent drawings, a description is given of a conveyance operation of a conveyance object in each conveyance passage. Illustration of a sensor in each drawing may be omitted.

As illustrated in FIG. 3, the sheet conveying device 110 has a plurality of conveyance passages in which conveyance directions are distinguished from each other. For example, the sheet conveying device 110 includes an entry passage 1100, a first conveyance passage 1101, a purge conveyance passage 1113 as a second conveyance passage, an enclosing conveyance passage 1104 as a third conveyance passage, and a sheet exit passage 1109 as a fourth conveyance passage.

An entry roller pair 101 is disposed in the entry passage 1100. The entry passage 1100 is a passage in which the conveyance object ejected from an apparatus located on the upstream side (for example, the folding apparatus 300) is received. The envelope processing controller 190 receives the enclosing target information as the information related to the conveyance object from the controller (the printer controller 260 and the sheet folding controller 320) upstream from the envelope processing controller 190 and controls the start and stop of the rotation of the entry roller pair 101.

A first conveying roller pair 111 serving as a first conveyor and a first intermediate conveying roller pair 103 are disposed in the first conveyance passage 1101 disposed downstream from the entry roller pair 101.

The sheet conveying device 110 includes the sheet exit passage 1109 as a conveyance passage on the downstream side following the first conveyance passage 1101 that sends out the conveyance object, which has passed through the sheet conveying device 110, toward the post-processing apparatus 400 on the downstream side. An exit roller pair 102 is disposed in the sheet exit passage 1109.

When an enclosing processing that is described below is not performed on the conveyance object carried in from the upstream apparatus, the conveyance object passes through the first conveyance passage 1101 from the entry passage 1100 and is ejected to the apparatus on the downstream side via the sheet exit passage 1109.

In the following description, processing in which the conveyance object conveyed from the entry roller pair 101 is conveyed to the exit roller pair 102 via the first conveyance passage 1101 and is further conveyed downstream may be referred to as "normal conveyance processing". The sheet conveying device 110 performs the normal conveyance processing, not when an "envelope job" that encloses the conveyance object into the envelope E but when a "print job" that conveys the conveyance object to the post-processing apparatus 400 without enclosing processing.

The sheet conveying device 110 includes the enclosing conveyance passage 1104 as a fourth conveyance passage. The enclosing conveyance passage 1104 branches from the first conveyance passage 1101 on the downstream side of the first conveying roller pair 111 and continues to an enclosing roller pair 121 that holds the envelope E in which the conveyance object is enclosed. As described below, the enclosing conveyance passage 1104 as an enclosure conveyance passage communicates with an envelope conveyance passage 1105.

In the first conveyance passage 1101, a purge branching claw 11 as a purge branching member for switching the conveyance direction of a conveyance object is disposed between the first intermediate conveying roller pair 103 and the first conveying roller pair 111 and upstream from the first conveying roller pair 111. The purge branching claw 11 can switch the conveyance direction of the conveyance object to the enclosing conveyance passage 1104 or the sheet exit passage 1109, which are on the downstream side of the purge branching claw 11, or to the purge conveyance passage 1113.

A first purge roller pair 114 and a second purge roller pair 115 as purge conveyors are disposed in the purge conveyance passage 1113. The purge conveyance passage 1113 is provided with a purge ejection tray 50 serving as a second stacker and a second ejector.

In the sheet conveying device 110, an enclosing-and-ejection switching claw 13 is disposed at a branching position that branches from the first conveyance passage 1101 to the enclosing conveyance passage 1104. The enclosing-and-ejection switching claw 13 switches between a state in which the conveyance object conveyed by an envelope ejection passage 1108 is conveyed to the enclosing conveyance passage 1104 and a state in which the conveyance object is conveyed to the sheet exit passage 1109.

Here, a description is given of an outline of the conveyance processing of the conveyance object in the sheet conveying device 110. The conveyance object conveyed to the first conveyance passage 1101 is conveyed to the first conveying roller pair 111 by the first intermediate conveying roller pair 103. The first conveying roller pair 111 conveys the conveyed conveyance object downstream. When the enclosing-and-ejection switching claw 13 is in the state illustrated in FIG. 3, that is, when the enclosing-and-ejection switching claw 13 opens the enclosing conveyance passage 1104 as a direction in which the conveyance object is conveyed and closes a conveyance passage toward the exit roller pair 102, the conveyance object is conveyed to the enclosing conveyance passage 1104.

After the trailing end of the conveyance object conveyed from the first intermediate conveying roller pair 103 to the first conveying roller pair 111 is detected by the conveyance sensor, the conveyance object turns into the state where the conveyance object is already moving to the enclosing conveyance passage 1104 when the conveyance object is conveyed by a specified distance. When the envelope processing controller 190 determines that the conveyance object has reached the above-described state, the operation of each conveying roller pair rotating in the sheet conveying device 110 is stopped. As a result, control can be performed such that the subsequent conveyance object does not contact the preceding conveyance object until the preceding conveyance object is inserted into the envelope E and is directed to the sealing processing.

When the trailing end of the conveyance object conveyed from the first intermediate conveying roller pair 103 to the first conveying roller pair 111 and further conveyed to the exit roller pair 102 is detected by the conveyance sensor, the conveyance object has already been ejected to the post-processing apparatus 400. When the envelope processing controller 190 determines that the conveyance object has reached the above-described state, the operation of each conveying roller pair rotating in the sheet conveying device 110 is stopped.

A driving source for operating each conveying roller pair disposed in the envelope processing apparatus 100 individually supplies a driving force to one roller of each conveying roller pair, and the other roller is driven by the one roller. For example, a motor serving as a driving source corresponding to each conveying roller pair is individually provided. Rotation control of each motor is individually performed. As a result, for example, the control is performed such that a specific conveying roller pair is rotated, and the other conveying roller pairs are stopped. A plurality of roller pairs may be driven by a single motor. Even in this case, rotation and non-rotation of each roller (roller pair) may be individually controlled.

As illustrated in FIG. 3, the enclosing device 120 also functioning as an enclosing device is provided with the envelope conveyance passage 1105 as a vertical conveyance passage connected to the enclosing conveyance passage 1104 as a fourth conveyance passage disposed in the sheet conveying device 110. The envelope conveyance passage 1105 extends in a direction intersecting with a placement surface (X-Y plane) of the envelope processing apparatus 100, more specifically, in a direction (Z direction) orthogonal to the X-Y plane, so-called, in a vertical direction. In other words, the envelope conveyance passage 1105 is a conveyance passage extending in a substantially vertical direction from the enclosing conveyance passage 1104. As a result, in the envelope processing apparatus 100, the conveyance direction in which the envelope E is conveyed to an enclosing position is the vertical direction as in the envelope conveyance passage 1105.

The envelope E before the enclosure is inserted is placed on an envelope set tray 127. The envelope E placed on the envelope set tray 127 via the envelope conveyance passage 1105 is conveyed from an envelope entry passage 1107, which is described below, to the envelope conveyance passage 1105, and is conveyed to the enclosing position disposed along the envelope conveyance passage 1105.

When the envelope E is conveyed from the envelope entry passage 1107 to the envelope conveyance passage 1105, the flap ef of the envelope E is opened. The envelope E with the flap ef opened is conveyed to the enclosing position. This series of operations is described below.

The sealed envelope E, which has been conveyed to the enclosing position and into which the conveyance object has been enclosed, is sealed in a sealing conveyance passage 1106 on the way to an envelope ejection tray 134. The sealed envelope E is conveyed to the envelope ejection tray 134 and ejected. The envelope conveyance passage 1105 is also used as a conveyance passage at the time of ejection.

This series of switching of the conveyance direction of the envelope E is performed by a claw-shaped member that appropriately operates according to the position of the envelope E being conveyed. A roller pair constituting the envelope conveyance passage 1105 switches the conveyance direction depending on the position of the envelope E. Thus, a switchback conveying operation is performed in which the envelope E is conveyed in a direction opposite to the direction in which the envelope E is once conveyed. The enclosure is conveyed to the envelope conveyance passage 1105 directly connected to the enclosure conveyance passage 1104 branched from the first conveyance passage 1101. As a result, a part of the envelope conveyance passage 1105 also functions as a conveyance passage for the enclosure.

As described above, since the configuration that conveys the envelope E for the enclosing operation and the sealing operation and the configuration that conveys the enclosure with respect to the envelope E are arranged in the vertical direction with respect to the placement surface of the envelope processing apparatus 100, the installation area of the envelope processing apparatus 100 can be reduced. The print system 1 including the envelope processing apparatus 100 can also be downsized.

The envelope conveyance passage 1105 includes an envelope holding mechanism that conveys the envelope E to the enclosing position as a specified position and holds the envelope E so that an enclosure is enclosed. The envelope conveyance passage 1105 is connected to the sealing conveyance passage 1106 for performing sealing processing on the envelope E in which the enclosure is enclosed.

A first vertical conveying roller pair 122 and a second vertical conveying roller pair 123 as an envelope conveyor for conveying the envelope E to a position where the conveyance object is received are disposed in the envelope conveyance passage 1105. The enclosing roller pair 121 serving as an enclosure conveyor that conveys and supplies an enclosure to the envelope E is disposed above the first vertical conveying roller pair 122 (in the +Z direction) in the envelope conveyance passage 1105.

The enclosing roller pair 121 conveys the enclosure in the enclosing direction (−Z direction) to perform the enclosing operation with respect to the envelope E conveyed to and held at the enclosing position by the first vertical conveying roller pair 122 and the second vertical conveying roller pair 123.

An enclosure pusher 160 is disposed between the enclosing roller pair 121 and the first vertical conveying roller pair 122 and on the side of the envelope conveyance passage 1105 and performs an operation of pushing the trailing end of the enclosure toward the opening of the envelope E during the enclosing operation.

Figure 23:
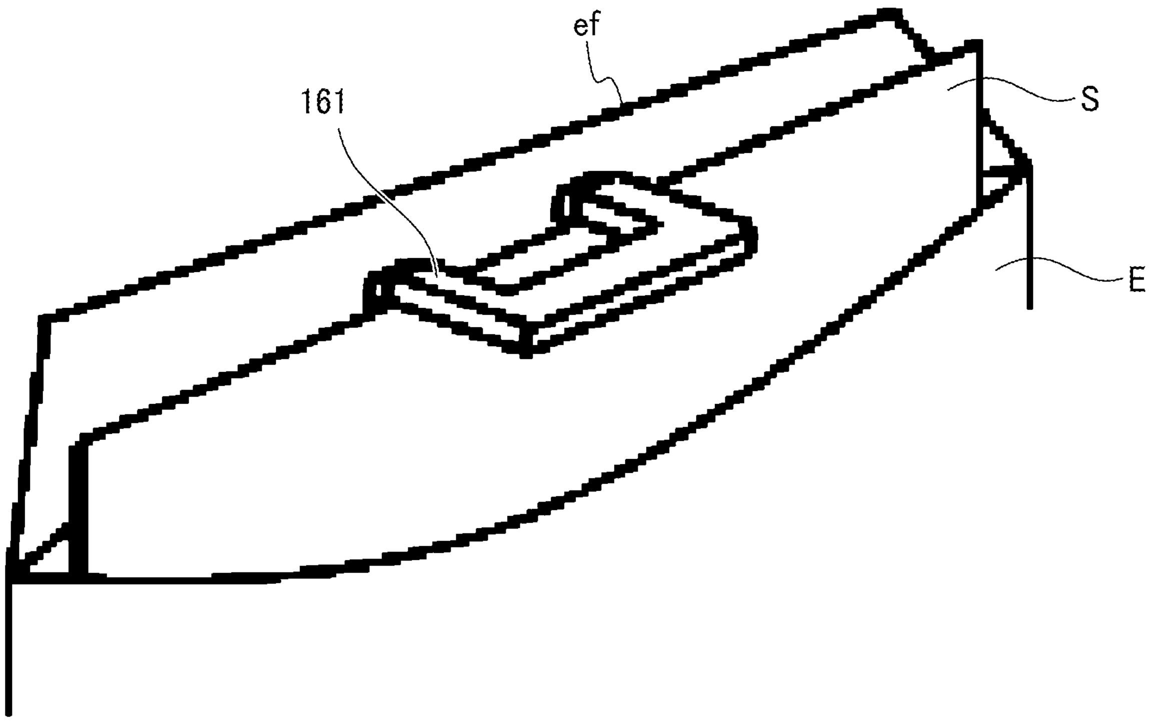
FIG. 23 is a perspective view of an enclosure pusher included in the envelope processing apparatus, according to an embodiment of the present disclosure.

As illustrated in FIG. 23, the enclosure pusher 160 includes a pushing craw 161. The pushing craw 161 has a configuration to move from a specified position toward the −Z direction. The movement control of the pushing claw 161 is performed by the envelope processing controller 190. Accordingly, when the envelope E is conveyed to the sealing position and held with the flap ef open, the pushing claw 161 moves to press the trailing end of the sheet S inserted from the upstream side. Thus, the sealing processing can be performed.

The flap opening mechanism 128 is disposed at a connection position of a conveyance passage extending from the envelope conveyance passage 1105 to the sealing conveyance passage 1106 and a connection position of an envelope entry passage 1107 that conveys the envelope E taken out from the envelope set tray 127 to the envelope conveyance passage 1105. The flap opening mechanism 128 has a configuration for opening the flap ef when the envelope E taken out from the envelope set tray 127 as an envelope holding tray is conveyed to the envelope conveyance passage 1105. The flap opening mechanism 128 also has a configuration for switchback conveyance in which the conveyance direction is switched such that the envelope E with the flap ef opened is conveyed to the enclosing position.

An envelope switchback switching claw 21 serving as a conveying guide in the flap opening mechanism 128 is disposed at a junction where the envelope conveyance passage 1105 and the envelope entry passage 1107 join each other.

A flap opening roller pair 124 constituting the flap opening mechanism 128 is disposed below a first branch position (in the −Z direction) that is a position where the envelope entry passage 1107 and the envelope conveyance passage 1105 join.

The flap opening roller pair 124 includes a pair of a drive roller and a driven roller. The envelope E is nipped between outer circumferential surfaces of the drive roller and the driven roller and is conveyed by rotation of the drive roller. A flap opening claw 40 serving as a flap opener is attached to a drive shaft to rotate coaxially with a rotation shaft of the drive roller.

The flap opening roller pair 124 disposed below the first branch position, and the first vertical conveying roller pair 122 and the second vertical conveying roller pair 123 disposed above the first branch position constitute a first vertical conveyor.

A separation roller pair 125 and an envelope conveying roller pair 126 are disposed in the envelope entry passage 1107 that joins the envelope conveyance passage 1105. A part of the stacked envelope E is taken out from the envelope set tray 127 by the separation roller pair 125. The envelope E is supplied to the envelope conveyance passage 1105 by the separation roller pair 125 and the envelope conveying roller pair 126 as an envelope supplier.

As illustrated in FIGS. 5 to 17, multiple envelopes E are stacked on the envelope set tray 127. The envelope E has a head portion and a bottom portion regardless of its outer shape and dimension. An opening portion is formed in the head portion, and a flap ef functioning as a lid for closing the opening portion is provided. The envelope E placed on the envelope set tray 127 is in a state where the bottom portion which is an opposite end of the flap ef faces the separation roller pair 125, and the flap ef is closed. Note that the state in which the flap ef is closed refers to a state where the flap ef is bent at a boundary position with the main body of the envelope E so that the leading end of the flap ef approaches the main body of the envelope E.

When the envelope E is ejected from the envelope set tray 127, the leading end of the envelope E in the conveyance direction corresponds to the bottom portion of the envelope E. The trailing end of the envelope E in the conveyance direction is the flap ef in a folded state.

Accordingly, in the present embodiment, when an envelope E is separated from envelopes E stacked in the envelope set tray 127 and conveyed through the envelope entry passage 1107 toward the flap opening roller pair 124, the downstream side of the envelope E in the conveyance direction is the bottom portion of the envelope E. The upstream side of the envelope E in the conveyance direction is the flap ef of the envelope E. In other words, the bottom portion of the envelope E conveyed in the envelope entry passage 1107 corresponds to the "leading end in the conveyance direction" in the envelope entry passage 1107. The flap ef corresponds to the "trailing end in the conveyance direction" in the envelope entry passage 1107.

The envelope E conveyed from the envelope set tray 127 by the separation roller pair 125 is conveyed by the envelope conveying roller pair 126 to a position beyond the envelope switchback switching claw 21. The envelope switchback switching claw 21 beyond which the envelope E has passed is rotated to a position where the conveyance direction is switched.

The envelope switchback switching claw 21 is held in either a position for temporarily conveying the envelope E from the envelope set tray 127 to the sealing conveyance passage 1106 or a position for conveying the envelope E toward the sheet conveying device 110 in the envelope conveyance passage 1105. That is, the envelope switchback switching claw 21 is a member that switches the conveyance direction of the envelope E.

The first vertical conveying roller pair 122 and the second vertical conveying roller pair 123 convey and hold the envelope E to a specified position in the envelope conveyance passage 1105. As described below, the specified position is a position where the position of the opening of the envelope E (the position of the flap ef) is lower than the enclosing roller pair 121 and higher than the first vertical conveying roller pair 122.

The enclosing roller pair 121 is a type of conveying roller that rotates in a direction in which the conveyance object conveyed from the sheet conveying device 110 is enclosed in the envelope E.

As illustrated in FIG. 3, in the sealer 130, a third vertical conveying roller pair 131 and a fourth vertical conveying roller pair 132 as a switchback conveyor are disposed in the sealing conveyance passage 1106. The sealer 130 further includes the envelope ejection passage 1108 that branches from the sealing conveyance passage 1106 at a second branching position. An envelope ejection switching claw 31 is disposed at a second branching position. An envelope ejection roller pair 133 is disposed in the envelope ejection passage 1108. The envelope ejection roller pair 133 is disposed at an end portion of the envelope ejection passage 1108.

The third vertical conveying roller pair 131 and the fourth vertical conveying roller pair 132 constitute a second vertical conveyor, convey the envelope E to a specified position of the sealing conveyance passage 1106, and hold the envelope E.

The envelope ejection switching claw 31 rotates between a position at which the envelope E is conveyed from the flap opening roller pair 124 to the third vertical conveying roller pair 131 in the enclosing conveyance passage 1104 and a position at which the envelope E is conveyed from the enclosing conveyance passage 1104 to the envelope ejection passage 1108. The envelope ejection switching claw 31 is a member that switches the conveyance direction of the envelope E.

A sealing mechanism 135 as a sealer that performs "sealing processing" of closing the flap ef is disposed in the sealing conveyance passage 1106. If the flap ef of the envelope E conveyed by the third vertical conveying roller pair 131 and the fourth vertical conveying roller pair 132 is open, the sealing mechanism 135 performs a processing of closing the flap ef.

The envelope ejection roller pair 133 is a roller that ejects the envelope E toward the envelope ejection tray 134.

The envelope ejection tray 134, serving as an envelope stacker (first stacker) and a first ejector, is a tray on which the ejected envelopes E are stacked.

As described above, the conveyance passages that convey the conveyance object from the sheet conveying device 110 to the enclosing device 120 and the sealer 130 are disposed to be connected in the vertical direction (Z direction) in the envelope processing apparatus 100. This connected conveyance passage, which serves as both a conveyance passage for the conveyance object and a conveyance passage for the envelope E, corresponds to the vertical conveyance passage in which the envelope conveyance passage 1105 of the enclosing device 120 and the sealing conveyance passage 1106 of the sealer 130 are connected in the vertical direction (Z direction).

Next, an example of a series of processes of the enclosing operation and the sealing operation in the envelope processing apparatus 100 is described with reference to FIGS. 4 to 15. In FIGS. 4 to 15, reference signs are mainly assigned to elements used in the description of each of operation steps. For the sake of explanation, the steps of the processing are distinguished from each other in the drawings. However, the processes may proceed in parallel. Note that, in the envelope processing apparatus 100 illustrated in FIGS. 4 to 15, the conveyance sensors (indicated by black triangles in FIG. 3) are arranged between the conveying roller pairs and detect positions and conveyance states of the conveyance object and the envelope E.

Figure 4:
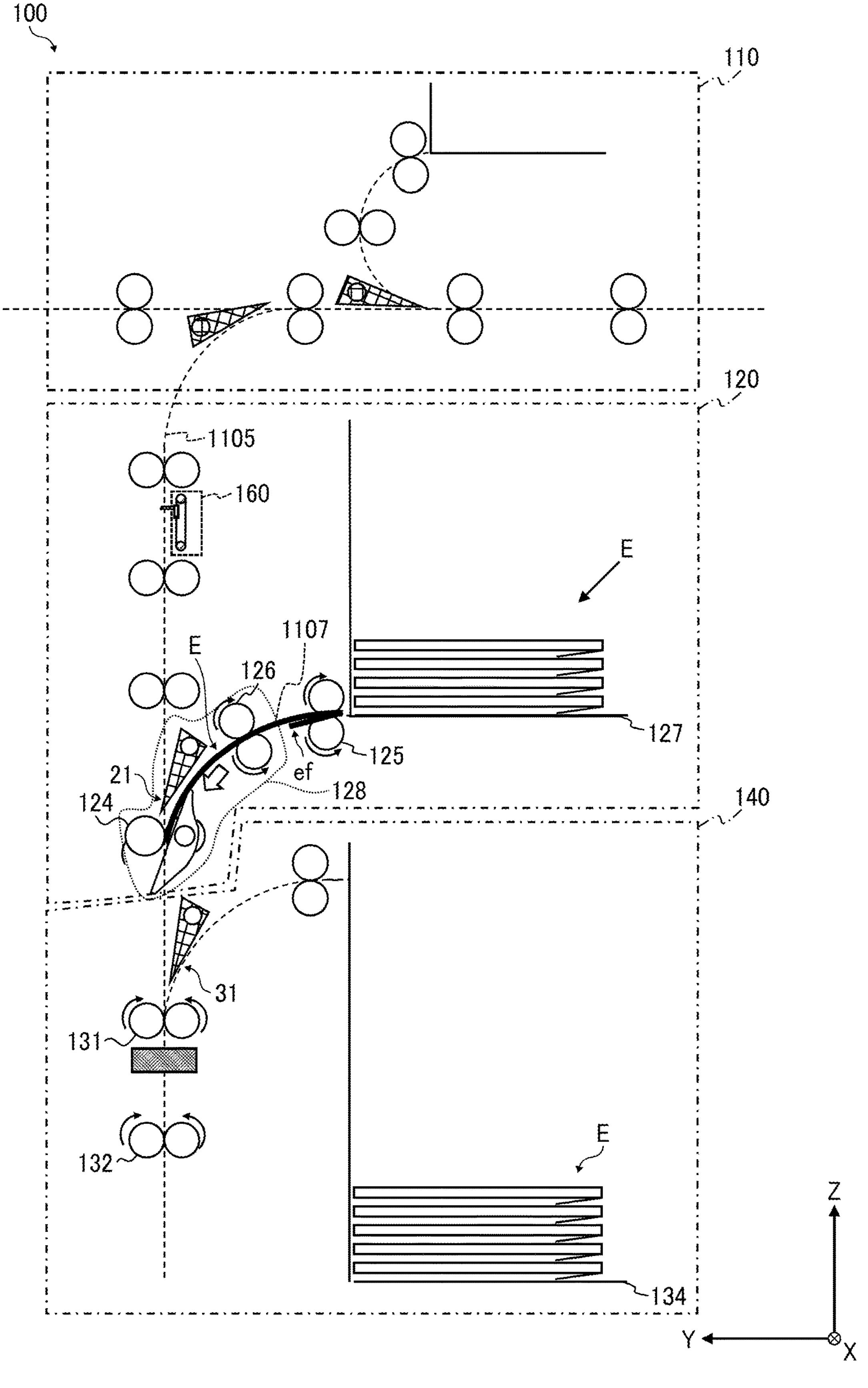
FIG. 4 is a diagram illustrating a step of the enclosing operation of the envelope processing apparatus according to an embodiment of the present disclosure.

First, as illustrated in FIG. 4, the envelopes E are separated one by one by the separation roller pair 125 from the envelope set tray 127 on which a plurality of envelopes E are stacked and are conveyed to the flap opening roller pair 124 by the envelope conveying roller pair 126. At this time, the envelope switchback switching claw 21 and the envelope ejection switching claw 31 are oriented in the directions illustrated in FIG. 3. The flap opening roller pair 124, the third vertical conveying roller pair 131, and the fourth vertical conveying roller pair 132 rotate in a direction in which the envelope E is conveyed downward and convey the envelope E to a specified position in the enclosing conveyance passage 1104.

Figure 5:
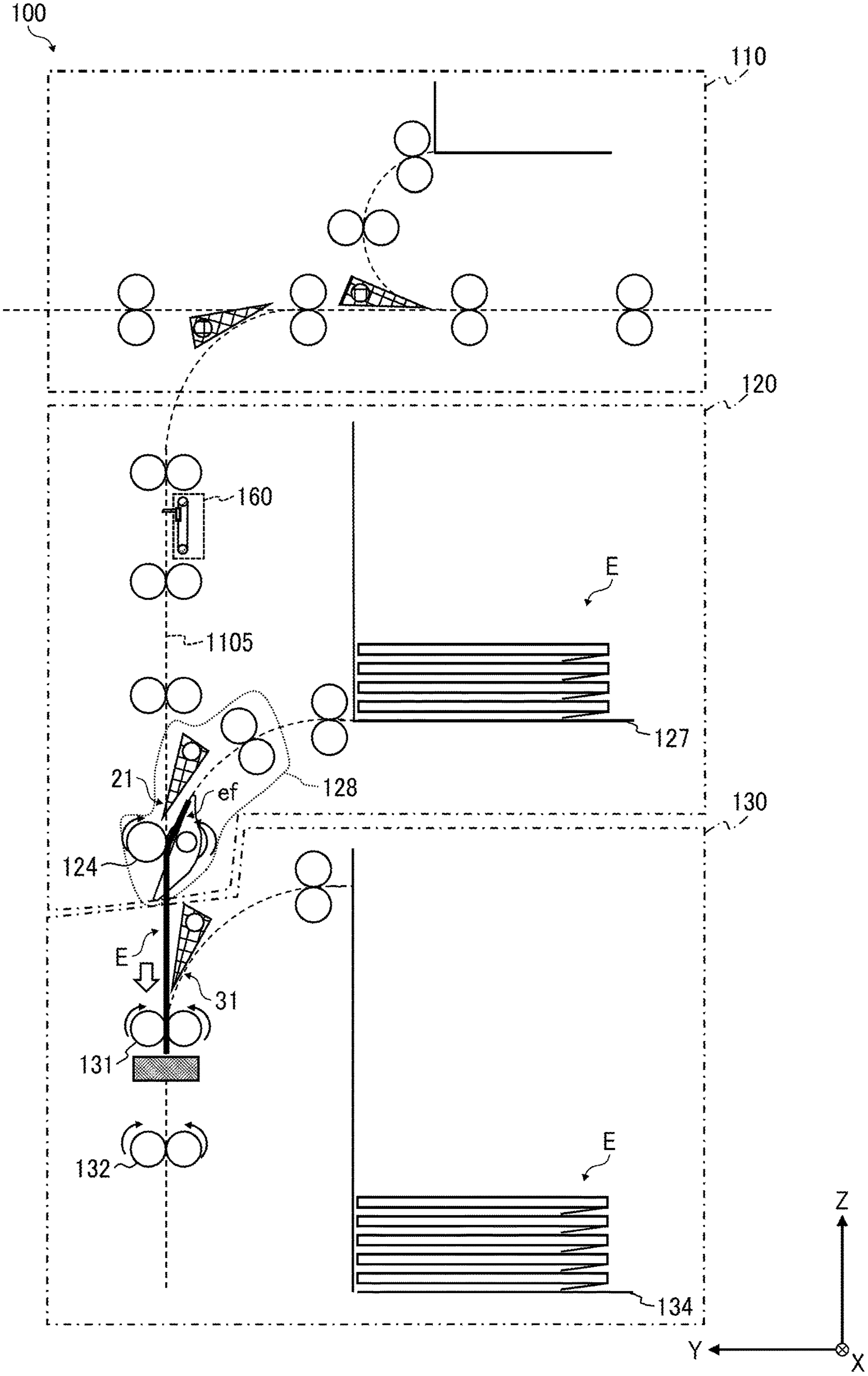
FIG. 5 is a diagram illustrating a step of the enclosing operation of the envelope processing apparatus, subsequent to the state in FIG. 4.

Subsequently, as illustrated in FIG. 5, when the envelope E completely passes through the flap opening roller pair 124, the flap ef is being opened by the flap opening mechanism 128. In this state, the envelope E reaches the subsequent state illustrated in FIG. 6 by the rotations of the flap opening roller pair 124, the third vertical conveying roller pair 131, and the fourth vertical conveying roller pair 132.

Figure 6:
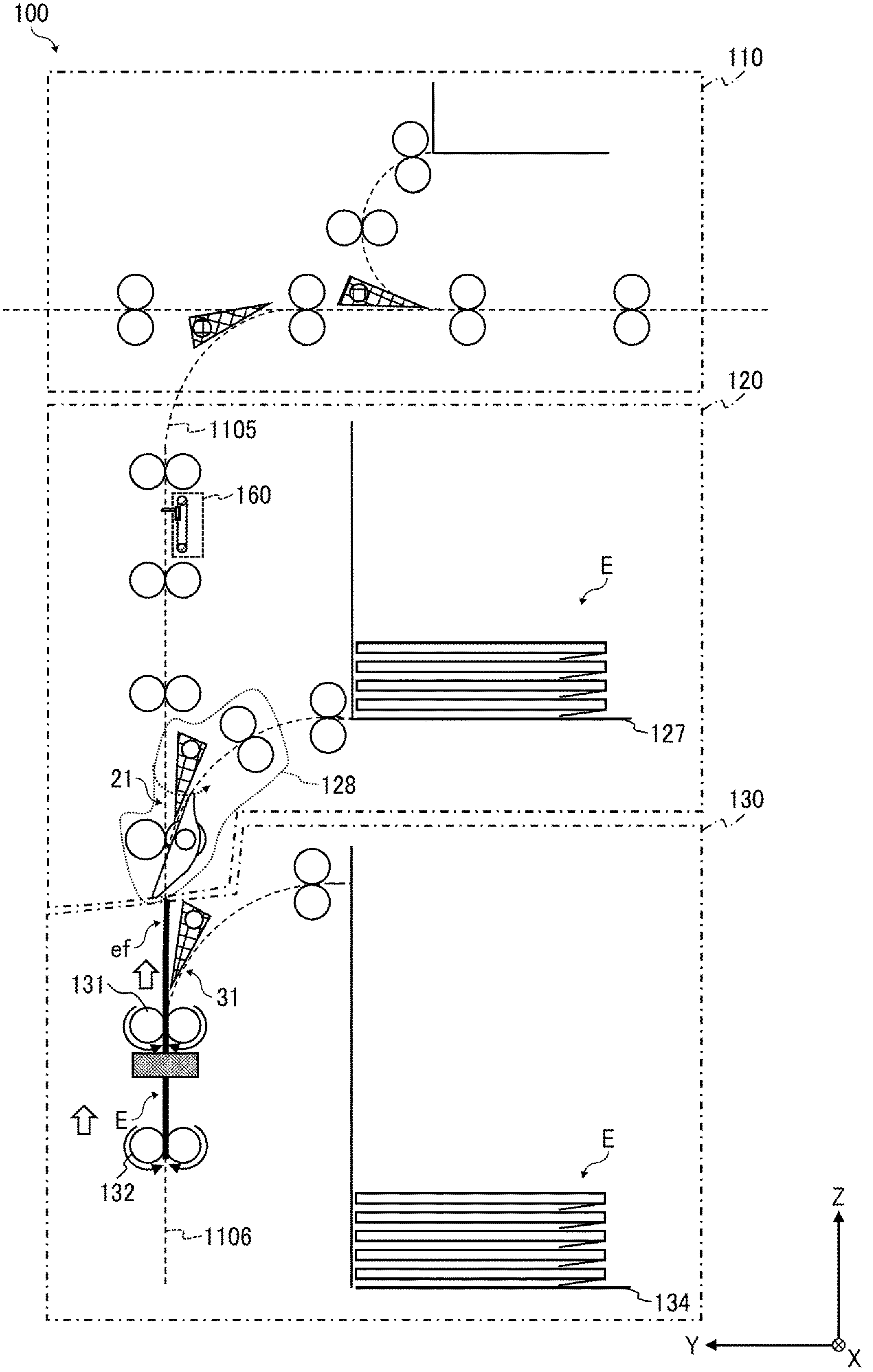
FIG. 6 is a diagram illustrating an operation of a flap opening mechanism in the enclosing operation of the envelope processing apparatus, subsequent to the state in FIG. 7.

As illustrated in FIG. 6, after the flap ef of the envelope E is being opened and reaches a position where the flap ef has passed through the flap opening roller pair 124, the third vertical conveying roller pair 131 and the fourth vertical conveying roller pair 132 are rotated in reverse. By this operation, switchback conveyance of the envelope E is performed toward a specified position of the enclosing device 120. The envelope switchback switching claw 21 rotates in a direction illustrated by a dashed arrow in FIG. 6 before switchback conveyance of the envelope E starts or simultaneously with switchback conveyance. As a result, the envelope E turns into the state where the envelope E can be conveyed upward in the envelope conveyance passage 1105. An envelope switchback roller includes the flap opening roller pair 124, the third vertical conveying roller pair 131, and the fourth vertical conveying roller pair 132.

Figure 7:
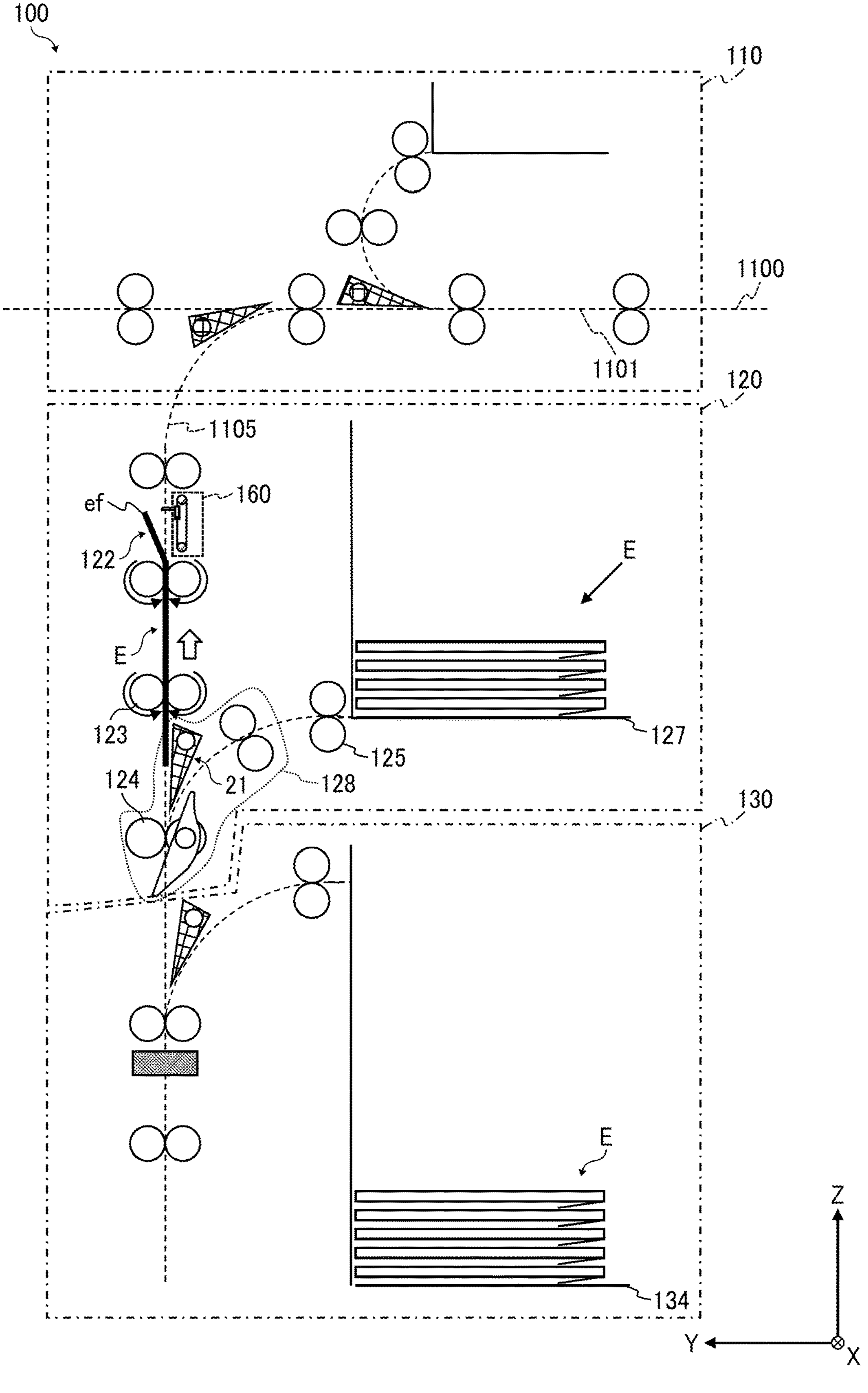
FIG. 7 is a diagram illustrating a step of the enclosing operation of the envelope processing apparatus, subsequent to the state in FIG. 6.

As illustrated in FIG. 7, the second vertical conveying roller pair 123 and the first vertical conveying roller pair 122 included in the switchback conveyor convey the envelope E to the enclosing position. When the flap ef has reached a position where the flap ef passes through the first vertical conveying roller pair 122, the rotations of the second vertical conveying roller pair 123 and the first vertical conveying roller pair 122 are stopped, and the enclosing standby operation is started.

In the control that conveys the envelope E to the enclosing position, the processing that calculates the conveyance amount of the envelope E from the rotation amount of each conveying roller is executed after the separation roller pair 125 takes out the envelope E. In addition, the position of the envelope E in the enclosing conveyance passage 1104 can be determined based on the calculated length of the envelope E and the length of the flap ef, the conveyance amount of the envelope E, and the length of the conveyance passage passing through the envelope entry passage 1107 and the envelope conveyance passage 1105.

Figure 8:
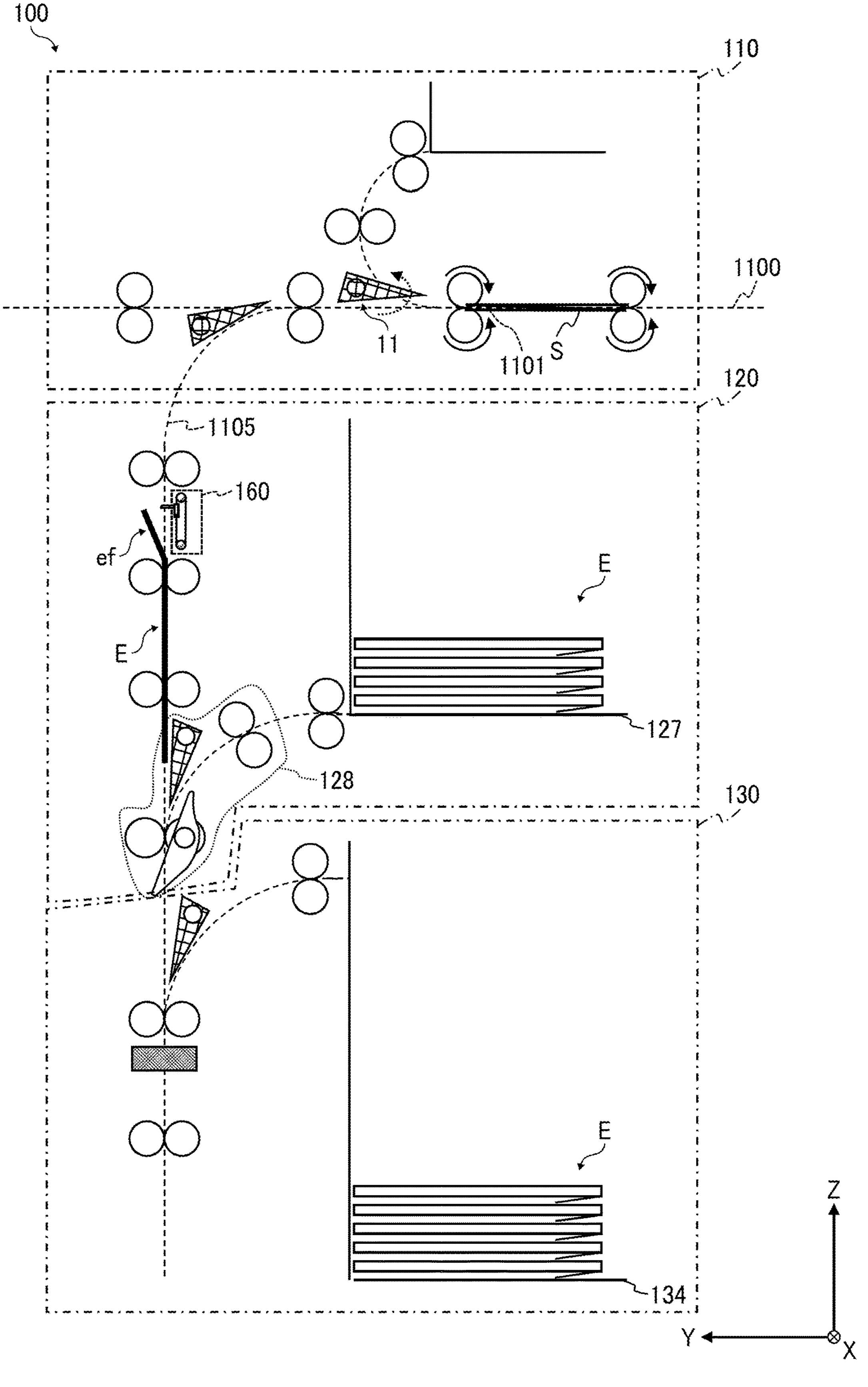
FIG. 8 is a diagram illustrating a step of the enclosing operation of the envelope processing apparatus, subsequent to the state in FIG. 7.

As illustrated in FIG. 8, in a state where the envelope E is held at the enclosing position, the envelope processing apparatus 100 receives the conveyance object from the upstream apparatus (the folding apparatus 300) by the entry roller pair 101 and conveys the conveyance object to the first conveyance passage 1101.

Figure 9:
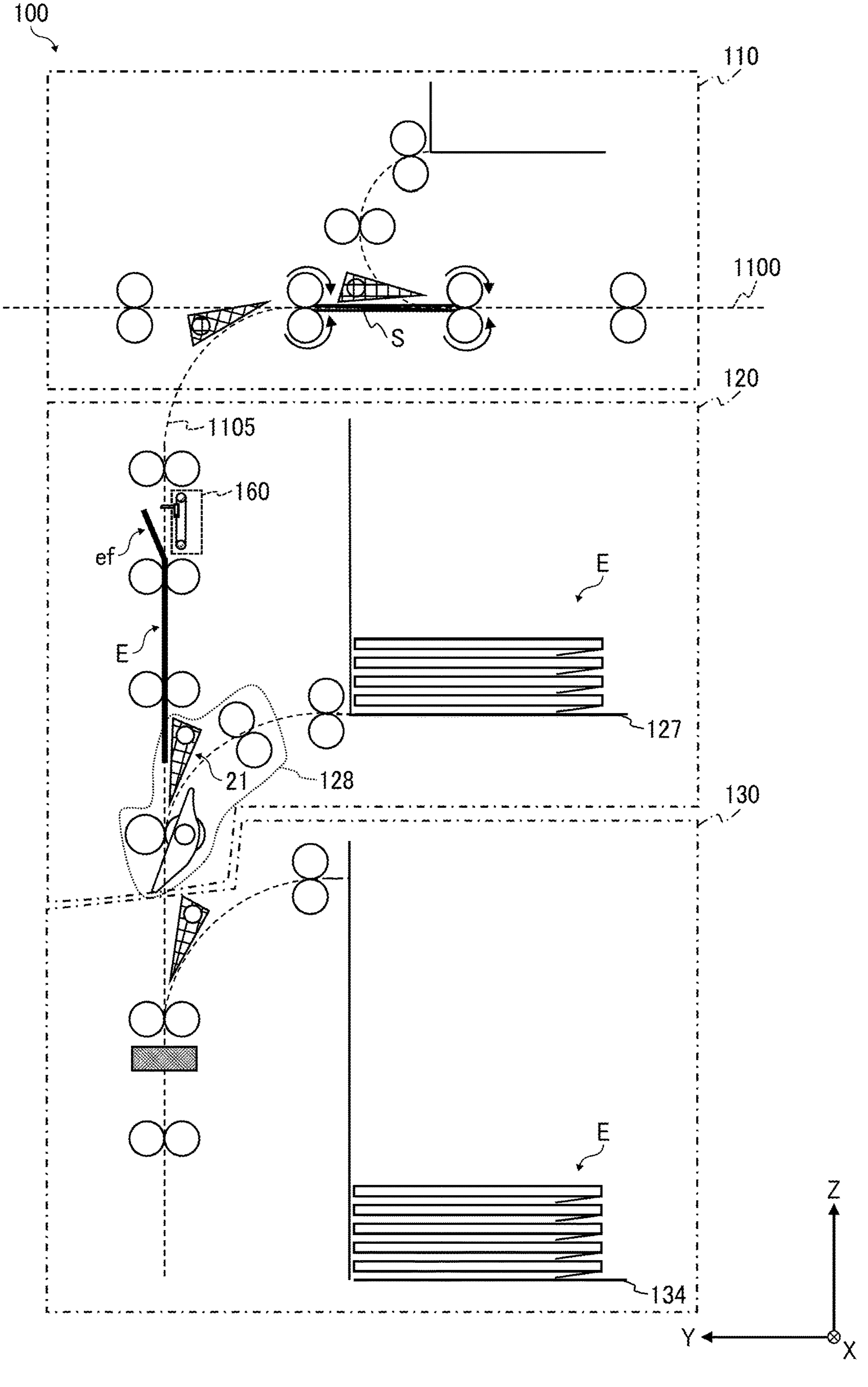
FIG. 9 is a diagram illustrating a step of the enclosing operation of the envelope processing apparatus, subsequent to the state in FIG. 8.

Subsequently, as illustrated in FIG. 9, the first intermediate conveying roller pair 103 and the first conveying roller pair 111 convey the conveyance object downstream in the sheet conveyance direction. At this time, the purge branching claw 11 and the enclosing-and-ejection switching claw 13 are positioned as illustrated in FIG. 7. The conveyance object is conveyed from the first conveyance passage 1101 to the enclosing conveyance passage 1104.

Figure 10:
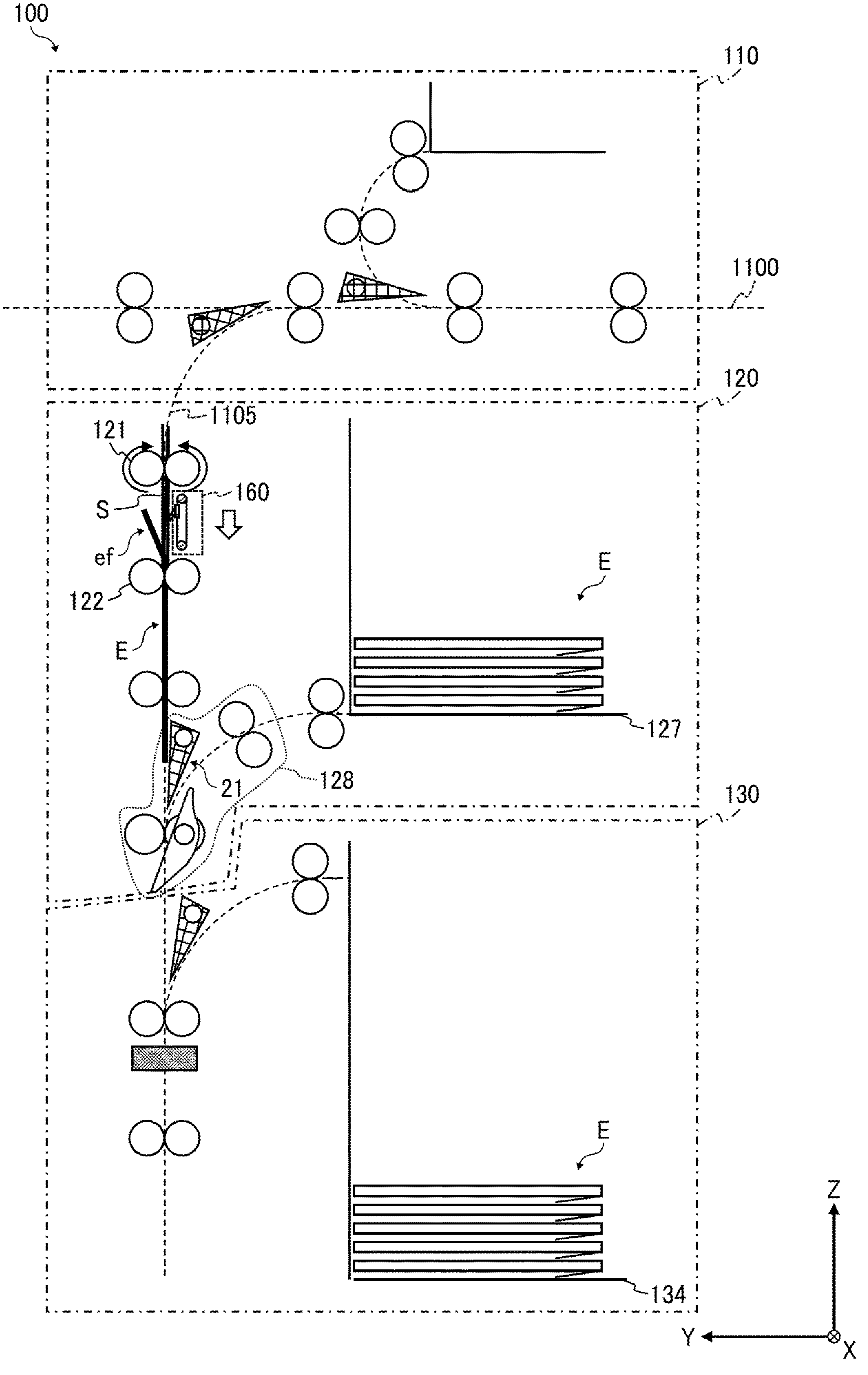
FIG. 10 is a diagram illustrating a step of the enclosing operation of the envelope processing apparatus, subsequent to the state in FIG. 9.

Thereafter, as illustrated in FIG. 10, the enclosing roller pair 121 conveys the conveyance object conveyed from the enclosing conveyance passage 1104 to the envelope conveyance passage 1105 further downward in the conveyance direction. As a result, the first vertical conveying roller pair 122 and the like hold the conveyance object at a specified enclosing position in the envelope conveyance passage 1105. The conveyance object is enclosed into the opening of the envelope E in the enclosing standby state. In this enclosing operation, the conveyance object is pushed into the envelope E by the enclosure pusher 160 as a pushing mechanism constituting an encloser.

Figure 11:
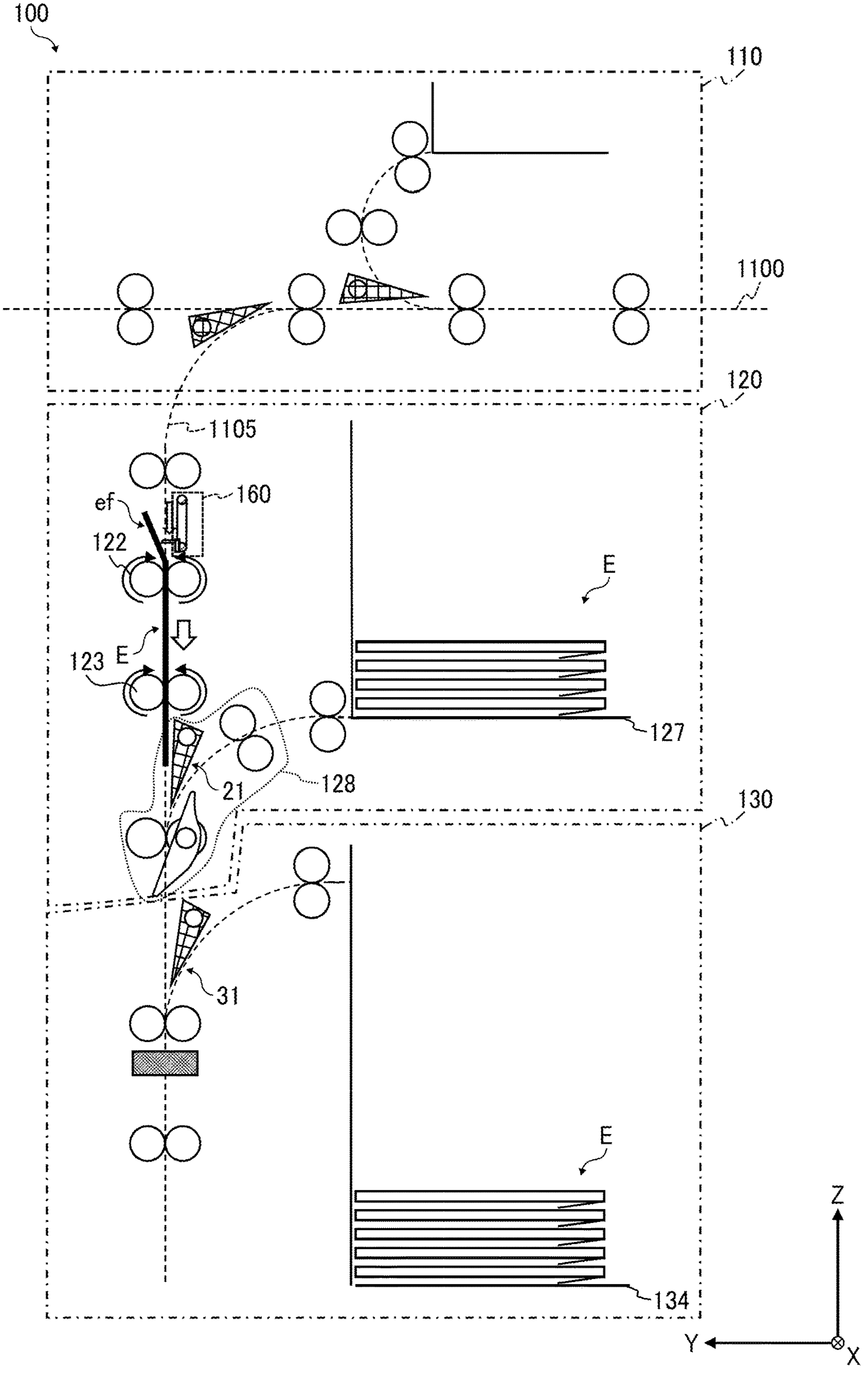
FIG. 11 is a diagram illustrating a step of the enclosing operation of the envelope processing apparatus, subsequent to the state in FIG. 10.
Figure 12:
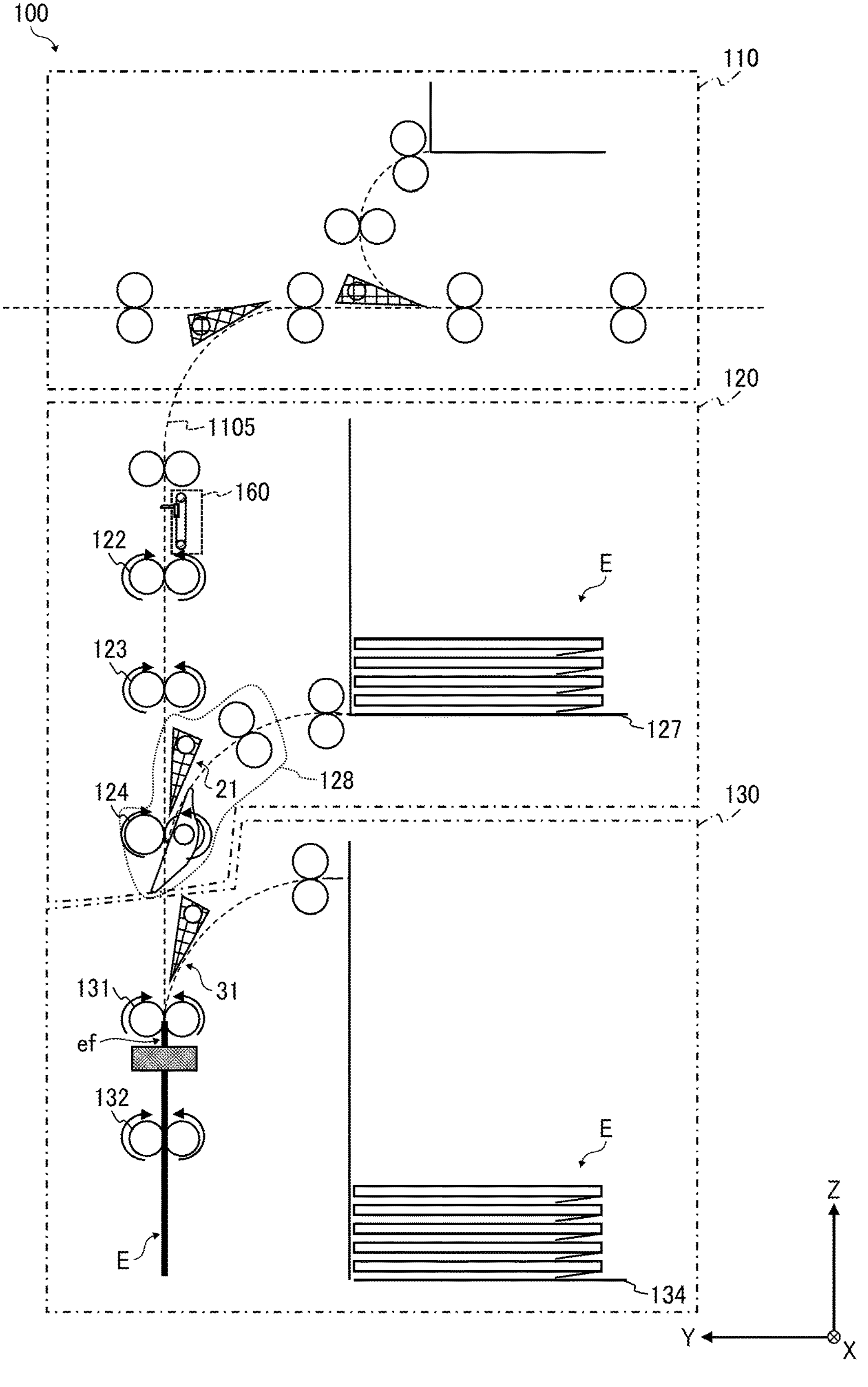
FIG. 12 is a diagram illustrating a step of the enclosing operation of the envelope processing apparatus, subsequent to the state in FIG. 11.

As illustrated in FIG. 11, the first vertical conveying roller pair 122 and the second vertical conveying roller pair 123 are rotated to convey the conveyance object performed push-in processing and the envelope E downward. As illustrated in FIG. 12, the envelope E is conveyed to the fourth vertical conveying roller pair 132, and the flap ef reaches a position where the flap ef passes through the envelope ejection switching claw 31.

Figure 13:
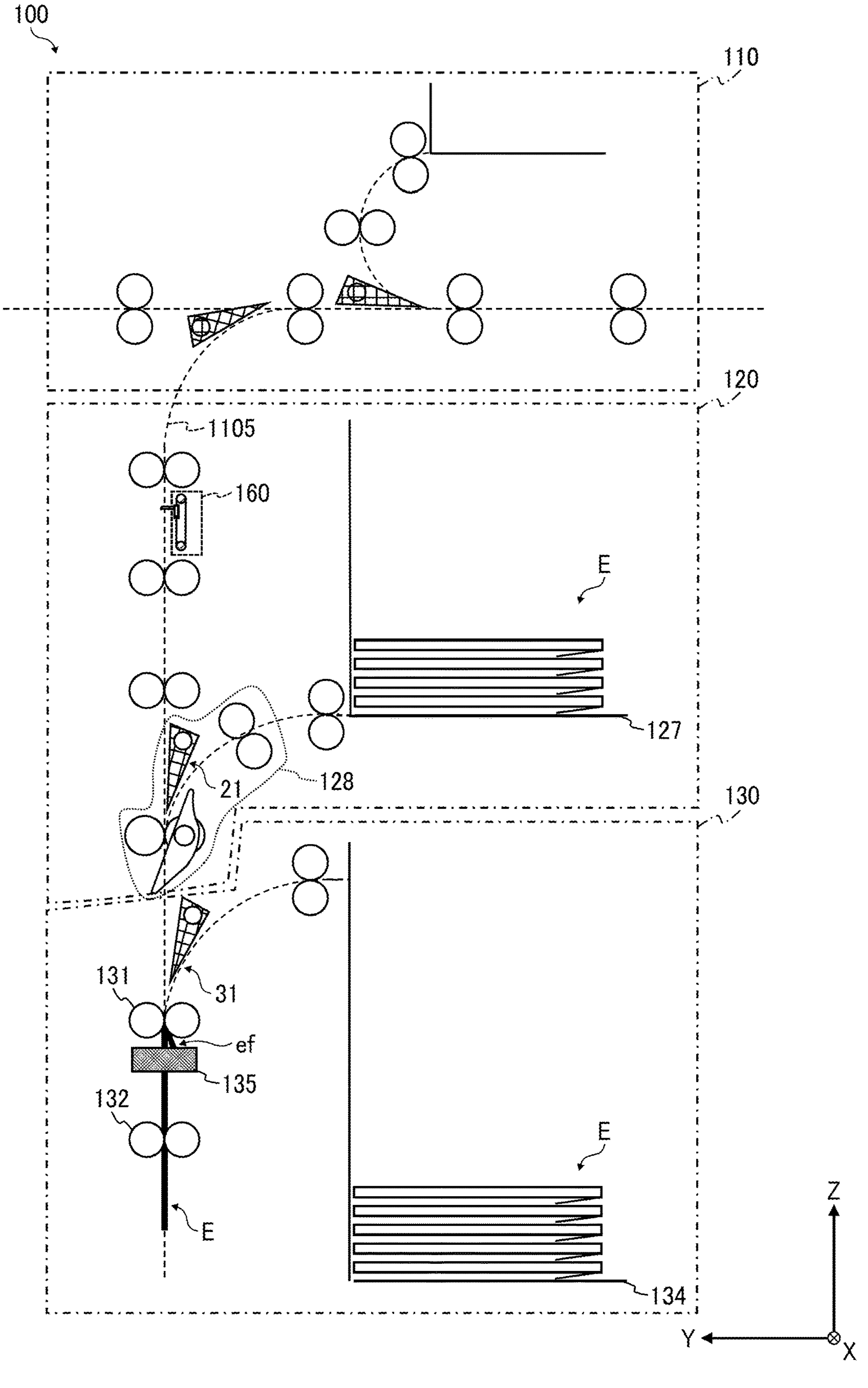
FIG. 13 is a diagram illustrating a step of the enclosing operation of the envelope processing apparatus, subsequent to the state in FIG. 12.

After the flap ef has reached the position where the flap ef passes through the envelope ejection switching claw 31, as illustrated in FIG. 13, the flap ef is closed by the sealing mechanism 135 between the third vertical conveying roller pair 131 and the fourth vertical conveying roller pair 132 to seal the envelope E.

Figure 14:
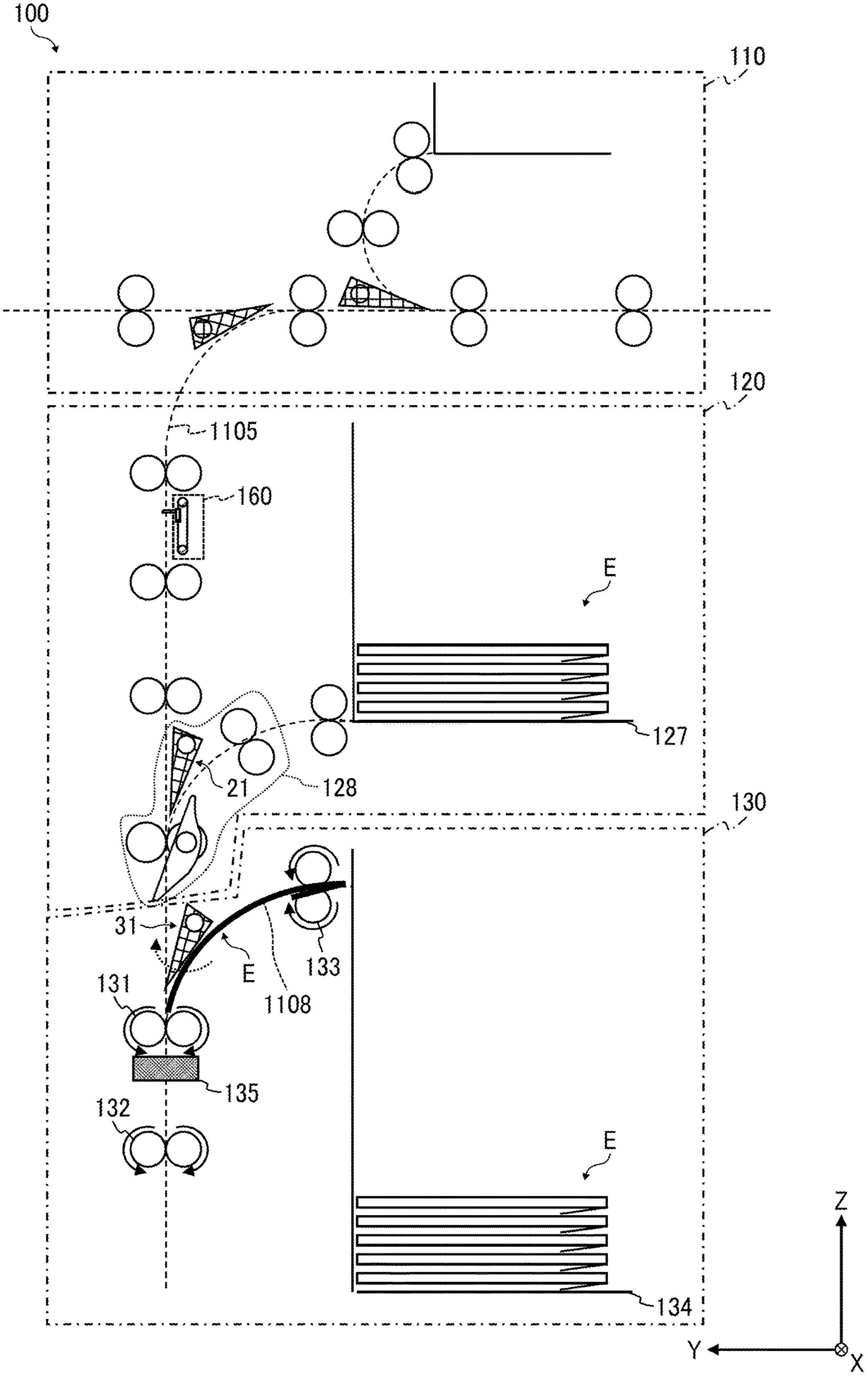
FIG. 14 is a diagram illustrating a step of the enclosing operation of the envelope processing apparatus, subsequent to the state in FIG. 13.

Thereafter, as illustrated in FIG. 14, the third vertical conveying roller pair 131 and the fourth vertical conveying roller pair 132 rotate in reverse to convey the sealed envelope E with switchback manner. Before the third vertical conveying roller pair 131 and the fourth vertical conveying roller pair 132 rotate in reverse, the envelope ejecting switching claw 31 rotates to be a state illustrated in FIG. 14. Thus, the sealed envelope E is conveyed from the envelope conveyance passage 1105 to the envelope ejection passage 1108.

Figure 15:
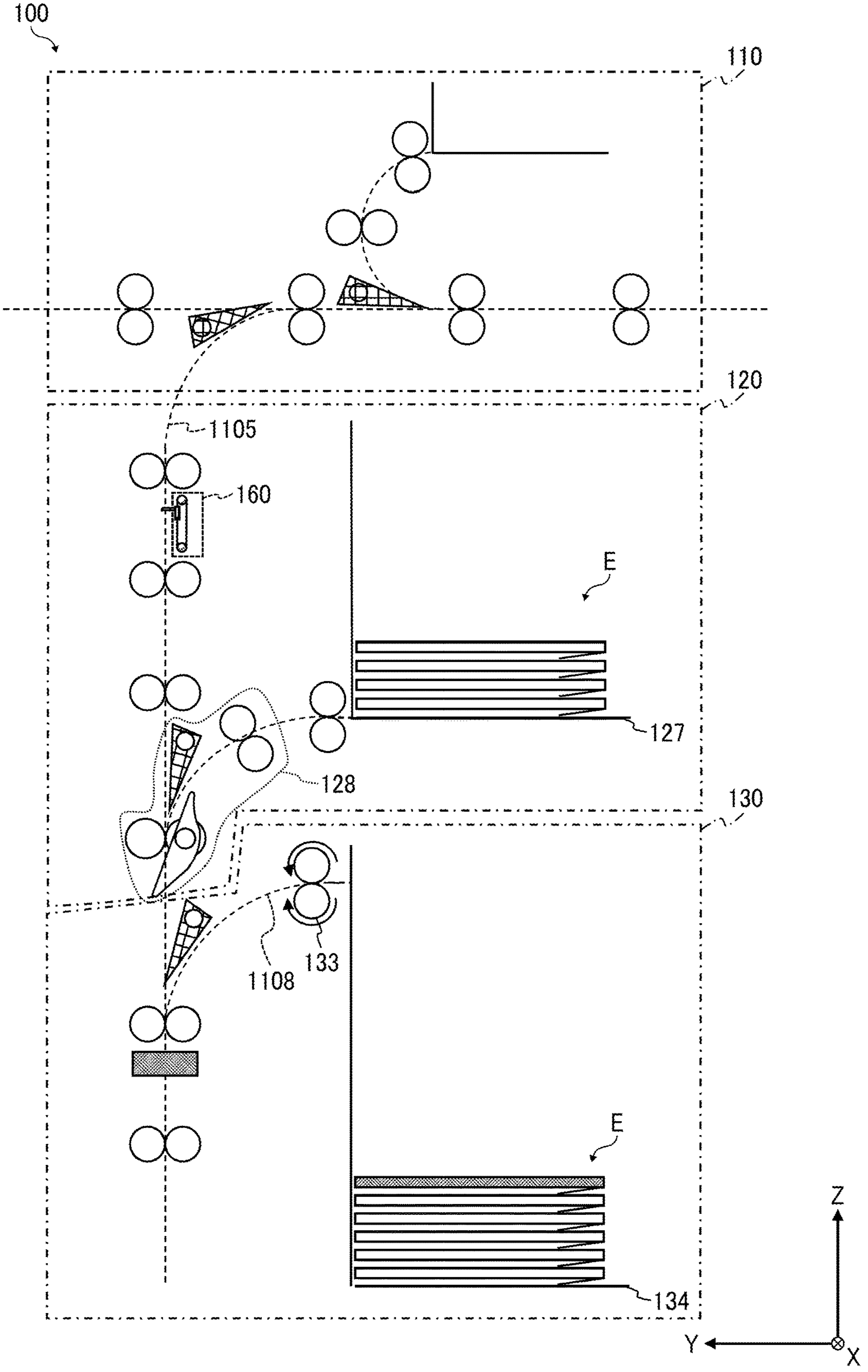
FIG. 15 is a diagram illustrating a step of the enclosing operation of the envelope processing apparatus, subsequent to the state in FIG. 14.

As a result, as illustrated in FIG. 15, the envelope ejection roller pair 133 ejects the sealed envelope E onto the envelope ejection tray 134.

Figure 16:
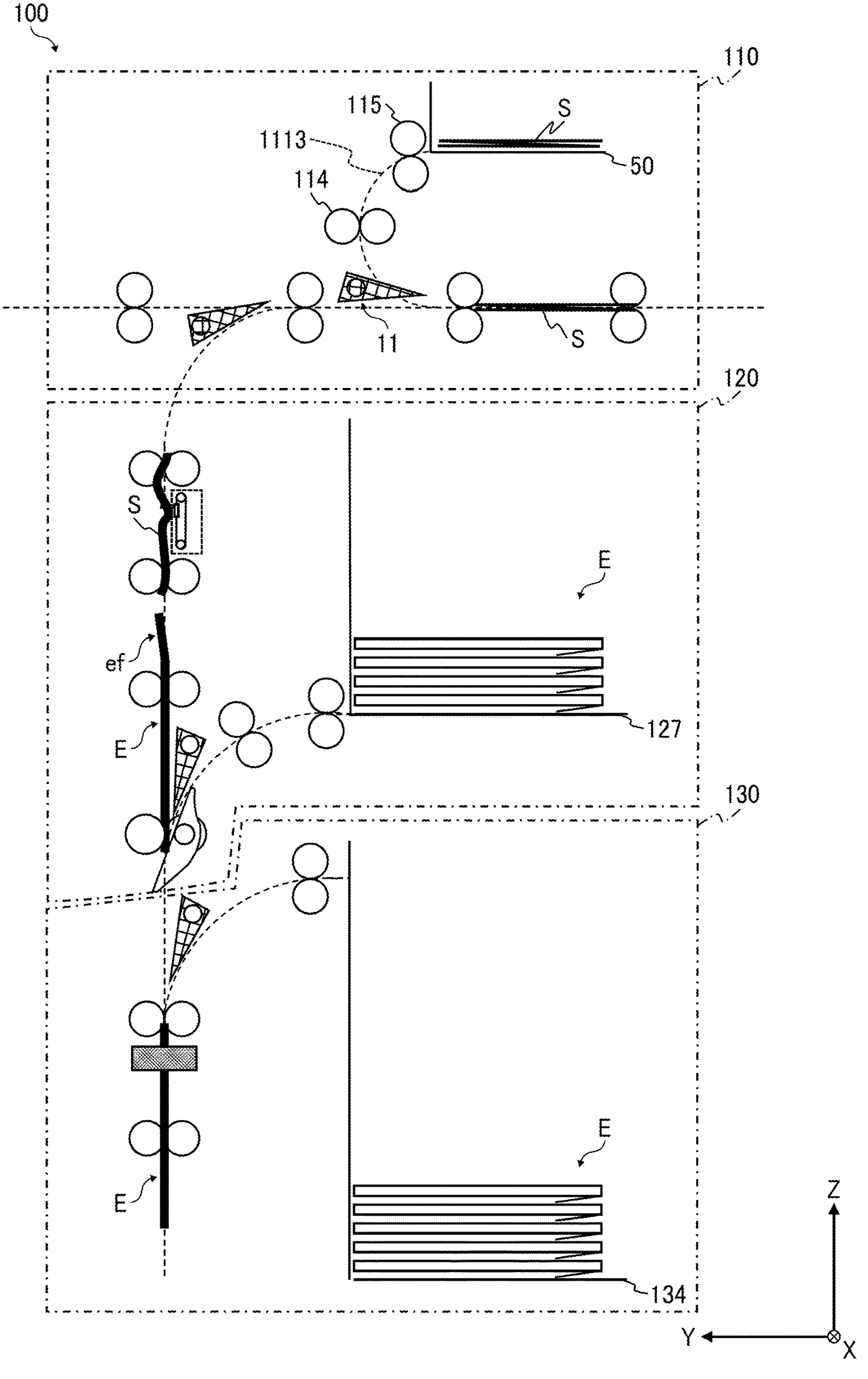
FIG. 16 is a diagram illustrating a purge conveyance operation of the envelope processing apparatus, according to an embodiment of the present disclosure.

Next, with reference to FIG. 16, a description is given of an outline of a purge conveyance operation that the envelope processing apparatus 100 can perform. FIG. 16 is a diagram illustrating a state where a conveyance abnormality has occurred (an abnormal conveyance state of the envelope E or the sheet S) before the purge conveyance operation is performed in the internal configuration of the envelope processing apparatus 100 in FIG. 3.

The following description assumes only the envelope E conveyed to the enclosing device 120 in the vertical conveyance passage and the sheet S as a conveyance object conveyed from the upstream side of the envelope processing apparatus 100. Note that the same applies to a case where the folded sheet Sf is set as a conveyance object.

Next, in an embodiment of the present disclosure, a description is provided of control processing performed in the envelope processing apparatus 100 having the above-described configuration with reference to FIG. 16 and subsequent drawings. In the following description, as illustrated in FIG. 16, at least one of the conveyance object or the envelope E exists in a plurality of conveyance passages included in the envelope processing apparatus 100 and any one of the conveyance object or the envelope E is assumed to be in an abnormal conveyance state. In such a state, the conveyance operation and the enclosing operation performed by the envelope processing apparatus 100 abnormally stop (conveyance failure).

Here, the "abnormal conveyance state" refers to a state different from a normal conveyance state, such as conveyance clogging and stagnation due to slippage. Among such failures, the "abnormal conveyance state" according to the present embodiment refers to a state in which there is a possibility that an abnormality in conveyance causes an interruption, a failure, or malfunction in the normal conveyance process or other operations, processes, and functions. Such an abnormal conveyance state needs to be processed appropriately. Note that various situations are assumed as the abnormal conveyance state according to the present embodiment. An example of such a "conveyance clogging (conveyance jam)" is a state where the sheet S or the envelope E as a conveyance object is caught in the middle of the conveyance passage to stagnate. A case where the conveyance object or the envelope E slips against a conveying roller and the conveyance object does not turn to be a specified conveyance state with respect to a drive amount of the conveying roller is also an example of the abnormal conveyance state.

In a case where the above-described abnormal conveyance state occurs in any one of a plurality of conveyance passages disposed in the envelope processing apparatus 100, in order to solve the cause of abnormality, a conveyance object that does not cause the abnormal conveyance state is also a target to be removed in combination with processing of the place that has caused the abnormality. As a result, removal processing needs to be performed on all conveyance objects present at other places than the place causing the abnormal conveyance state in the conveyance passage. In addition, even if the conveyance object or the envelope E at other places than the place causing the abnormality has no problem in a case where the removal processing described above is performed, the conveyance object or the envelope E may be damaged or scratched during the removal processing and thus may not be reused (disposal object).

That is, when an abnormal conveyance state occurs in any one of a plurality of conveyance objects present in a plurality of conveyance passages included in the envelope processing apparatus 100 at the same timing, man-hours to remove a conveyance object that is not in an abnormal conveyance state from the conveyance passages are necessary in order to restore a normal conveyance state. There is a possibility that the number of conveyance objects to be discarded increases by the number of conveyance objects on which the removal processing has performed.

As a result, a conveyance object that does not cause an abnormal conveyance state can be reused by processing the conveyance object by a removal way in which the conveyance object is not to be disposed. Thus, reduction in processing man-hours and more efficient sealing processing can be achieved.

In addition to the envelope ejection tray 134 serving as a first ejector that ejects the envelope E in which the sheet S conveyed from upstream is enclosed, the envelope processing apparatus 100 according to the present embodiment includes the purge ejection tray 50 serving as a second ejector. The envelope processing apparatus 100 according to the present embodiment has a function of enabling automatic ejection of the conveyance object (the sheet S or the envelope E) that is not in an abnormal conveyance state to one of the ejection trays in accordance with, in particular, the abnormal conveyance state such as conveyance clogging of the sheet S or the envelope E and a place causing the abnormal conveyance state during a series of conveyance in each function of enclosing and sealing.

Figure 17:
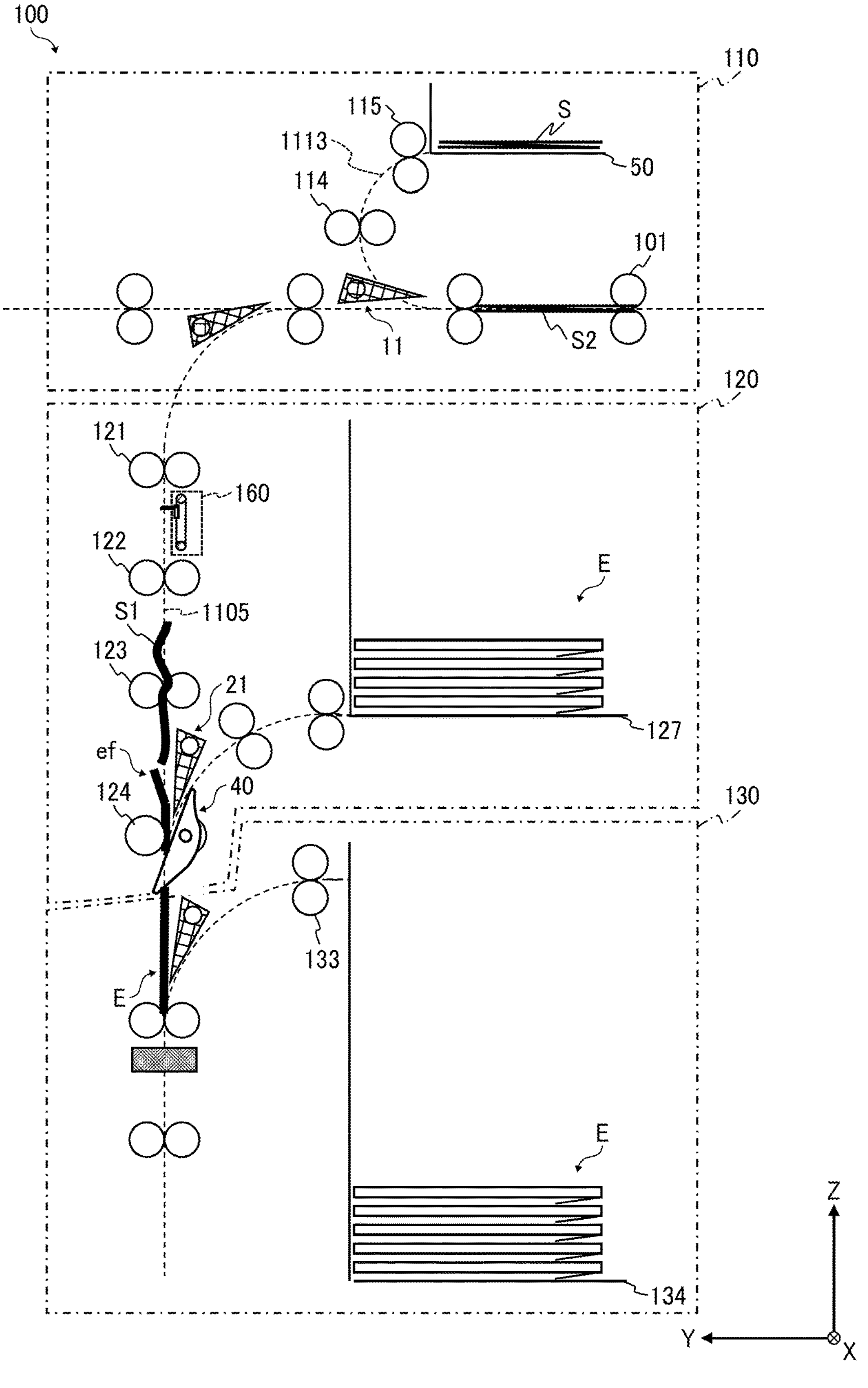
FIG. 17 is a diagram illustrating a step of the purge conveyance operation, subsequent to the state in FIG. 16.

As illustrated in FIG. 17, the purge ejection tray 50 is disposed upstream from the enclosing device 120. As a conveyance passage to the purge ejection tray 50, the envelope processing apparatus 100 includes the purge conveyance passage 1113 that is a conveyance passage branching from the conveyance passage (first conveyance passage 1101) in which the enclosing operation is performed with the sheet conveying device 110 and the enclosing device 120 as a boundary. A purge branching claw 11 is disposed upstream from the purge conveyance passage 1113. The sheet conveying device 110 has the function of enabling, with the purge branching claw 11, selection of the sealing direction or the ejection direction by the purge ejection tray 50 with respect to the conveyance object (sheet S) from the upstream side, which is the conveyance object (second sheet S2) illustrated of FIG. 17. At this time, when the abnormal conveyance state occurs in the enclosing device 120, the conveyance direction of the conveyance object S2 conveyed from the upstream side located in the sheet conveying device 110 is switched to the purge conveyance passage 1113 by the purge branching claw 11. The change of the conveyance passage by the switching operation can prevent the conveyance object (second sheet S2) on the upstream side from deteriorating following the conveyance object (first sheet S1) in the abnormal conveyance state and eject the conveyance object from the purge ejection tray 50 without damage.

Note that the purge ejection tray 50 functions as one of evacuation destinations of the sheet S in which the conveyance state is normal when the abnormal conveyance state occurs in any one of the plurality of conveyance passages disposed in the envelope processing apparatus 100. The purge ejection tray 50 also has a function of carrying in the sheet S after evacuation processing as an enclosure. In this case, the second purge roller pair 115 and the first purge roller pair 114, which are part of a second ejector, are rotated in a direction opposite to the rotation direction in the purge conveyance processing (are rotated in reverse).

First Embodiment

Next, a description is given of a purge conveyance operation of the envelope processing apparatus 100 according to a first embodiment of the present disclosure. FIG. 17 particularly illustrates a case where a conveyance failure has occurred in a conveyance passage before the sheet S is processed for enclosing. As already described, the envelope processing apparatus 100 includes the conveyance sensors between the conveying roller pairs (see FIG. 3). The envelope processing controller 190 monitors the detection signal of each conveyance sensor to determine how many conveyance objects are present on which the conveyance passage.

For example, the detection signal is turned to be "ON" when the sheet S passes through the position of each conveyance passage sensor and is turned to be "OFF" when the sheet S does not pass through the position of each conveyance passage sensor. In this case, the envelope processing controller 190 measures a time during which the detection signal of a certain conveyance sensor is turned on to calculate the speed (linear speed) of the conveyance object in the conveyance passage, the length of the conveyance object in the conveyance direction, and the residence time of the conveyance object in the conveyance passage, together with information on the position at which the conveyance sensor is disposed. In particular, the envelope processing controller 190 determines whether the conveyance object normally passes (is conveyed), whether a conveyance delay of the conveyance object occurs, or whether the conveyance object stagnates (is in an abnormal conveyance state) in the conveyance passage according to the calculated information.

In this example, it is assumed that in a case where one conveyance sensor is disposed between all adjacent pairs of the conveying roller pairs that constitute the conveyance passage between the entry roller pair 101 and the envelope ejection roller pair 133, a preceding first sheet S1 contacts, for example, the enclosure pusher 160 or the envelope switchback switching claw 21 adjacent to an area from the enclosing roller pair 121 to the flap opening roller pair 124 and stagnates in the envelope conveyance passage 1105. In such a case, the detection signal of the conveyance sensor disposed at each corresponding position is always in "ON" state. Thus, the envelope processing controller 190 determines that there is a stagnating object at the position.

Note that even in a case where there is a sheet S having a long dimension in the conveyance direction or in a case where there are a plurality of sheets S on the conveyance passage, the envelope processing controller 190 acquires detection signals of a plurality of conveyance sensors disposed in the conveyance passage to determine the position of the conveyance object that is stagnating. In particular, the envelope processing controller 190 determines the range of the conveyance object whose length in the conveyance direction is long. In a case where there are a plurality of sheets S in the conveyance passage, the envelope processing controller 190 determines the position of each one of the plurality of sheets S. Accordingly, the conveyance object and the envelope E in the normal conveyance state (conveyance objects other than the conveyance object which is in the stagnation state) can be determined in the normal conveyance state from the position of the conveyance object in the "ON" state and the detection time after the conveyance object turns to the "ON" state.

As illustrated in FIG. 17, in a case where the conveyance clogging of the first sheet S1 occurs in the enclosing device 120, the envelope processing controller 190 controls conveyance so that the sheet S (second sheet S2) upstream from the purge branching claw 11 disposed upstream from the enclosing device 120 in the conveyance direction is ejected from the purge ejection tray 50 by using the first purge roller pair 114 and the second purge roller pair 115 when the sheet S is in the normal conveyance state.

If the sheet S is in the normal conveyance state at a position downstream from the purge branching claw 11 and upstream from the enclosing roller pair 121, the second sheet S2 is conveyed from the enclosing-and-ejection switching claw 13 toward the exit roller pair 102 to be ejected from the post-processing apparatus 400.

For example, as illustrated in FIG. 17, a case is assumed in which the conveyance clogging of the first sheet S1 has occurred at a position immediately before enclosing. An example of a cause of such an assumed state is that the envelope switchback switching claw 21 or the enclosure pusher 160 pops out improperly to an expected operation, the leading end of the first sheet S1 contacts the envelope switchback switching claw 21 or the enclosure pusher 160, and the conveyance of the first sheet S1 stops.

In this case, the conveyance clogging occurs in the first sheet S1 between the first vertical conveying roller pair 122 and the second vertical conveying roller pair 123. At this time, the envelope E supplied from the envelope set tray 127 is in a state where the flap ef is opened. Conveyance of the envelope E is temporarily stopped downstream from the first sheet S1.

At this time, it is assumed that the stopped envelope E can be conveyed without damage except that the flap ef is open, a stacking state of the envelopes E set in the envelope setting tray 127 is unknown, and the envelopes E may close the separation roller pair 125. In such a case, the envelope E is ejected to the envelope ejection tray 134. As the processing operation, the envelope E is conveyed to the fourth vertical conveying roller pair 132 instead of being directed to the enclosing position, is conveyed by the envelope ejection roller pair 133 in the same manner as the conveyance after the enclosing and ejected. The above-described conveyance operation (processing function) is referred to as a "purge ejection operation (purge ejection processing)".

When the second sheet S2 is being conveyed upstream from the first vertical conveying roller pair 122 at which the trailing end of the first sheet S1 with the conveyance clogging is located, the conveyance direction is changed depending on whether the position of the second sheet S2 is upstream from the enclosing-and-ejection switching claw 13 or upstream from the purge branching claw 11. When the second sheet S2 is located upstream from the enclosing-and-ejection switching claw 13 and downstream from the purge branching claw 11, the second sheet S2 is conveyed to the post-processing apparatus 400 by the exit roller pair 102. When the second sheet S2 is located upstream from the purge branching claw 11, the purge branching claw 11 is rotated to eject the second sheet S2 from the purge ejection tray 50 via the purge conveyance passage 1113.

Figure 18:
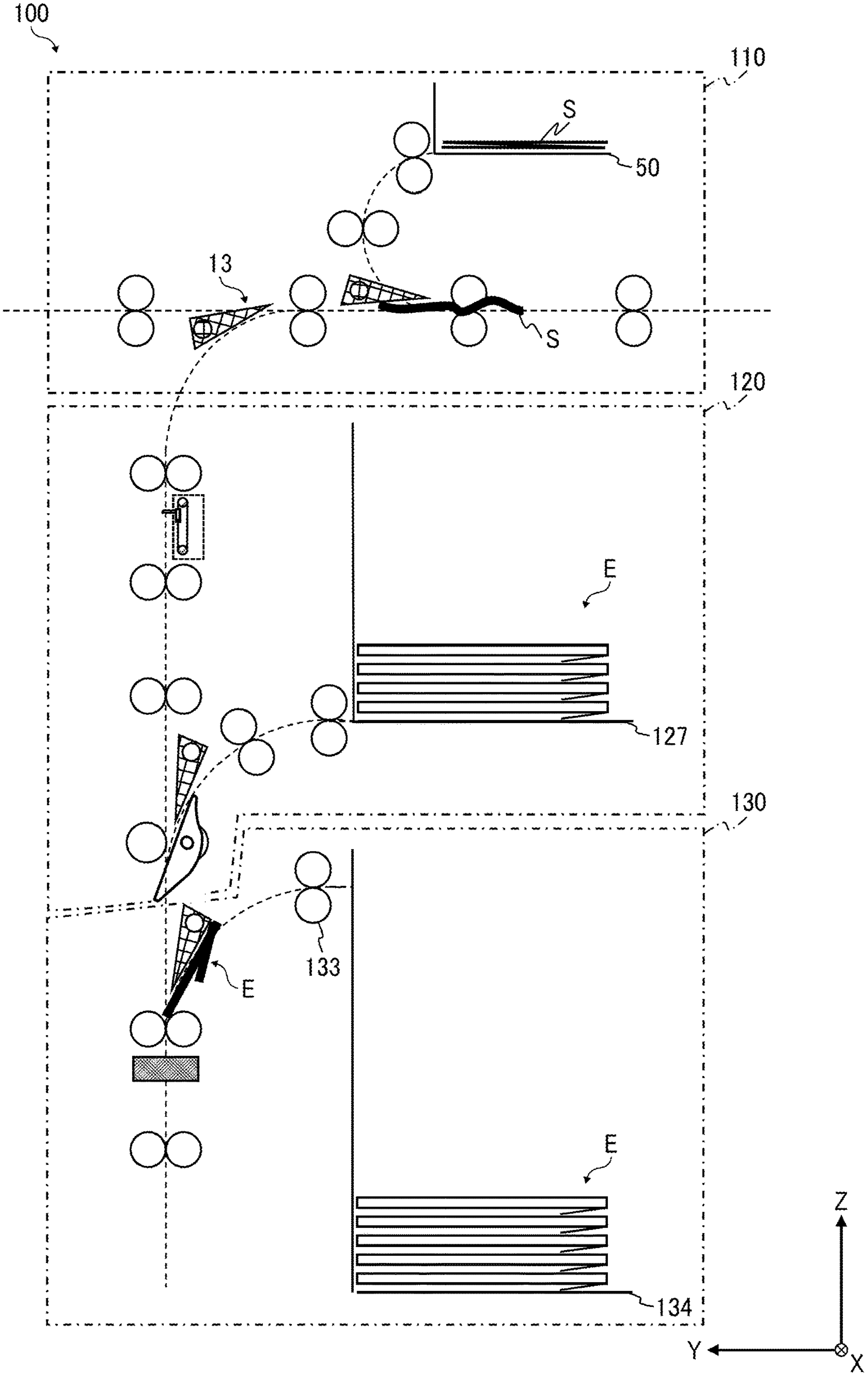
FIG. 18 is a diagram illustrating a step of the purge conveyance operation, subsequent to the state in FIG. 17.

With reference to FIG. 18, a description is given of the purge ejection processing according to the difference of the parts in the abnormal conveyance state. Hereinafter, a case where the conveyance clogging of the envelope E that has completed the enclosing process has occurred upstream from the flap opening roller pair 124 or the sheet S is caught and clogged by the purge branching claw 11 at a position upstream from the enclosing-and-ejection switching claw 13 is described as an example. In a case where the abnormal conveyance state has occurred at a position upstream from the flap opening roller pair 124 and downstream from the purge branching claw 11, and the conveyance object performed with push-in processed and the envelope E are at positions downstream from the flap opening roller pair 124 in the normal conveyance state, the conveyance object in the normal conveyance state at the position downstream from the flap opening roller pair 124 is conveyed by the envelope ejection roller pair 133 similarly to a normal operation and is performed with ejection processing. Similarly, the abnormal conveyance state occurs upstream from the purge branching claw 11. Regardless of whether the push-in processing is performed, the ejection processing is performed on the conveyance object and the envelope E downstream from the enclosing-and-ejection switching claw 13 by the envelope ejection roller pair 133 on the downstream side. In a case where the enclosing-and-sealing processing (the push-in processing or the sealing processing) has not been performed and the conveyance passage downstream from the enclosing-and-ejecting switching claw 13 is in the normal conveyance state, the ejection processing is performed by the envelope ejection roller pair 133 after the enclosing processing (push-in processing) and the sealing processing.

As a result, regardless of before and after the enclosing processing, the above-described operation is performed on envelopes E downstream from the clogged sheet S in order from an envelope closer to the envelope ejection roller pair 133, so that the ejection processing (purge ejection processing) from the conveyance passage can be performed.

Second Embodiment

Next, a description is given of a purge conveyance operation of the envelope processing apparatus 100 according to a second embodiment of the present disclosure. In addition to the already described purge processing according to the first embodiment, the number of sheets S that are discarded by the removal processing for the conveyance clogging can be reduced in a conveyance passage other than the conveyance passage for ejection (the envelope ejection passage 1108).

Figure 19:
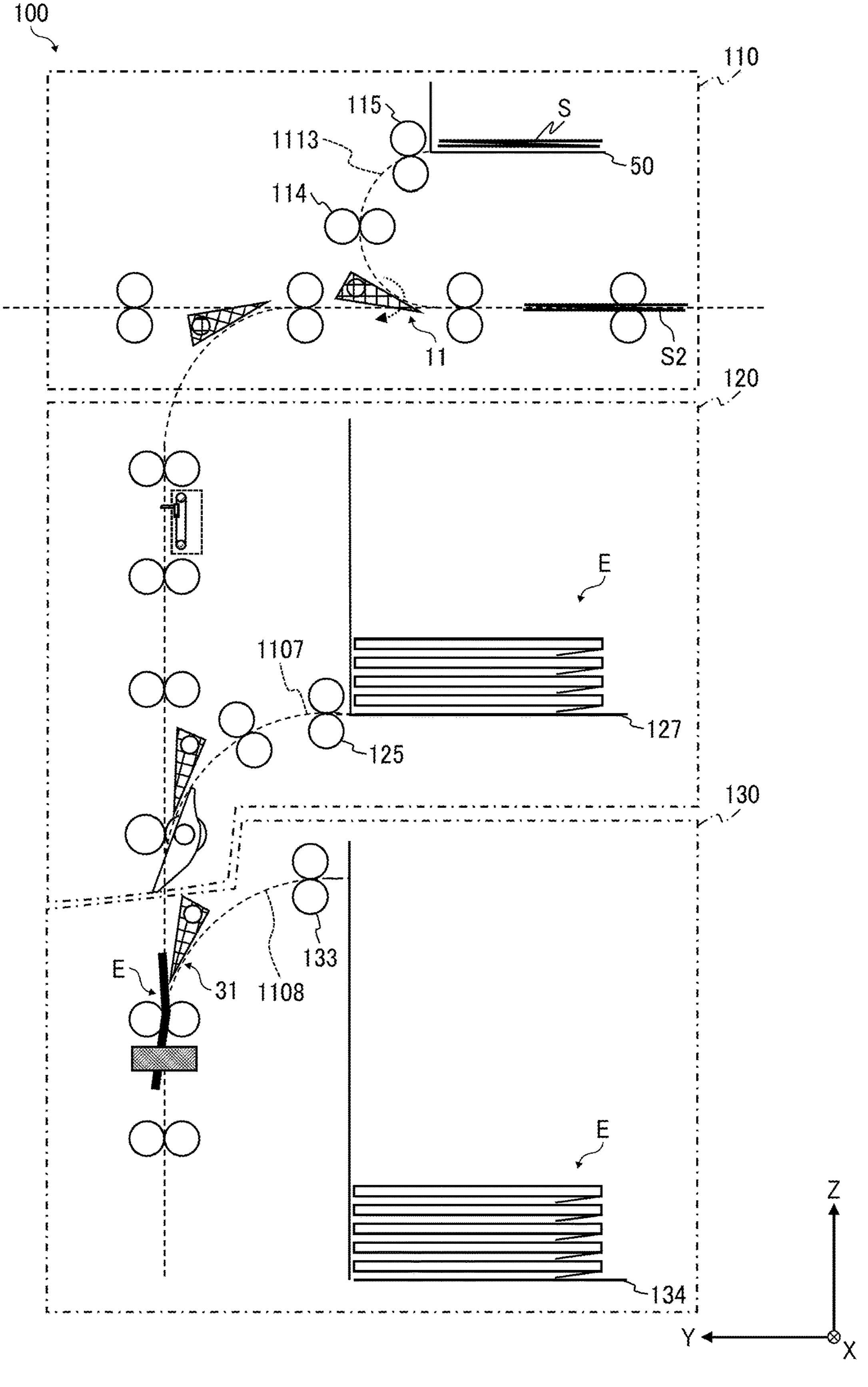
FIG. 19 is a diagram illustrating a step of the purge conveyance operation, subsequent to the state in FIG. 18.
Figure 20:
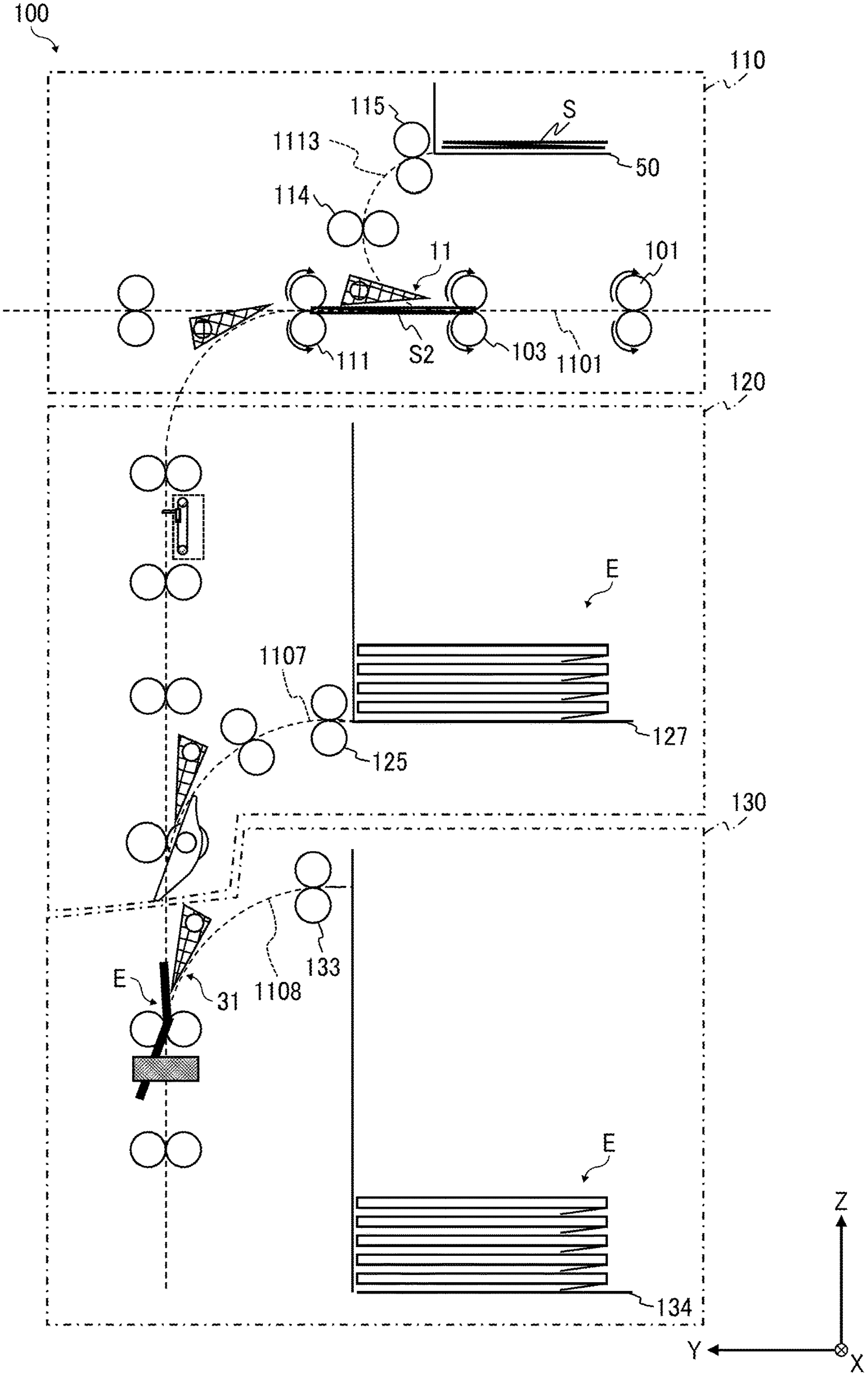
FIG. 20 is a diagram illustrating a step of the purge conveyance operation, subsequent to the state in FIG. 19.
Figure 21:
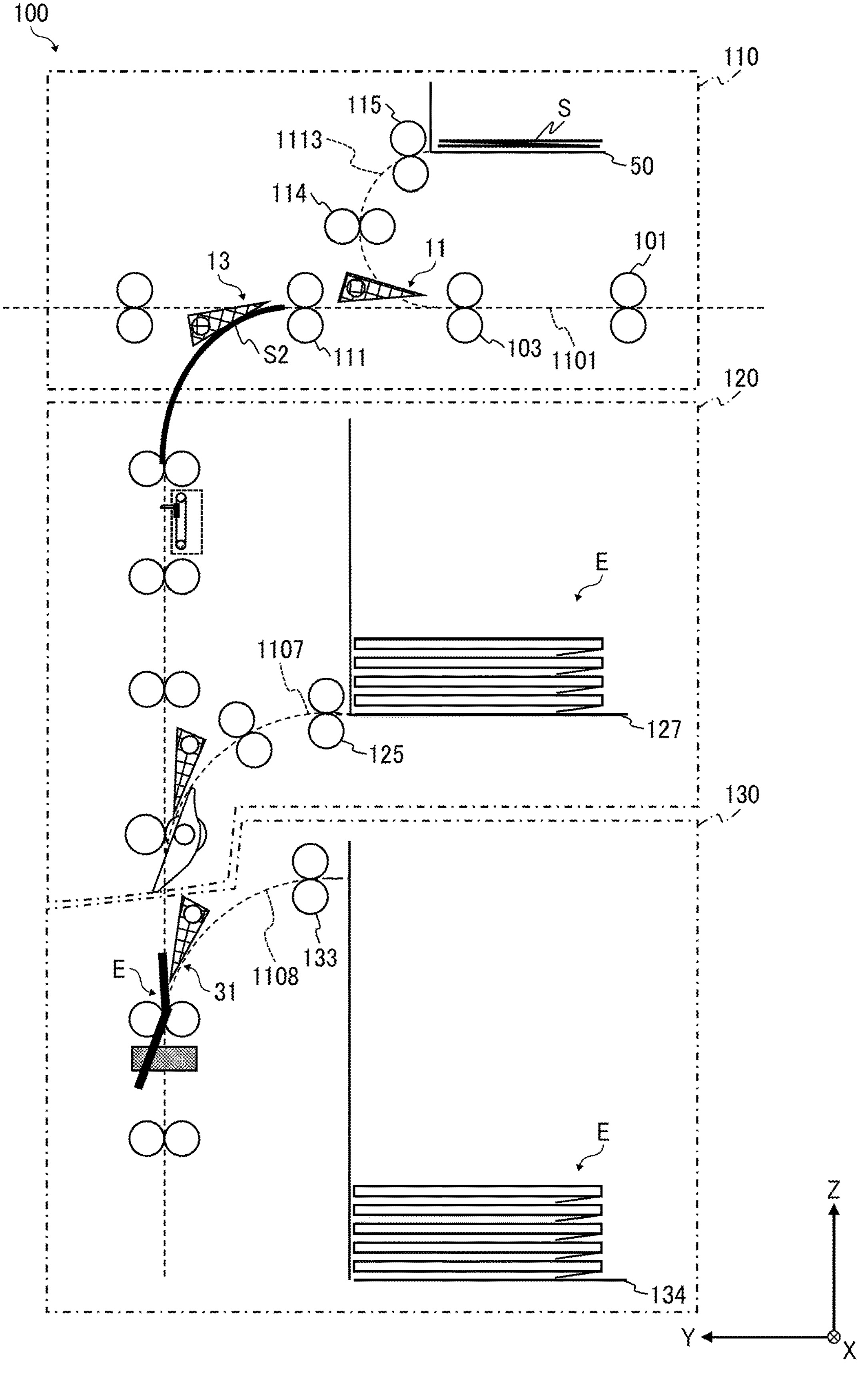
FIG. 21 is a diagram illustrating a step of the purge conveyance operation, subsequent to the state in FIG. 20.

FIGS. 19, 20, and 21 are diagrams illustrating a reverse conveyance operation that reverses conveyance as an example of a purge conveyance operation (purge ejection processing). FIGS. 19, 20, and 21 illustrate examples of the purge operation in a case where the abnormal conveyance state occurs downstream from the enclosing device 120 while the envelope E before and after the enclosing processing is being conveyed. In the present embodiment, the envelope E is picked up from the envelope set tray 127 by the separation roller pair 125 and is conveyed via the envelope entry passage 1107. The envelope processing apparatus 100 provides a purge ejection function for the envelope E in the abnormal state (conveyance failure) during a period from the enclosing processing to when the envelope E is ejected to the envelope ejection tray 134 by the envelope ejection roller pair 133.

For example, in a case where the envelope E after the enclosing processing is caught by the envelope ejection switching claw 31 and stagnates adjacent to the third vertical conveying roller pair 131, an ejection destination of the envelope E can be appropriately selected in the purge processing of the second sheet S2 according to the conveyance position of the second sheet S2.

As illustrated in FIG. 19, when the envelope processing controller 190 determines that the second sheet S2 located upstream from the enclosing device 120 is located upstream from the purge branching claw 11, the purge branching claw 11 is rotated to convey the second sheet S2 toward the purge conveyance passage 1113. Next, the second sheet S2 is ejected to the purge ejection tray 50.

For example, in a case where the purge ejection tray 50 is not provided or conveyance objects that have already been ejected are fully stacked on the purge ejection tray 50, the second sheet S2 may be conveyed (ejection processing) to the post-processing apparatus 400 by the exit roller pair 102 with the purge branching claw 11 not rotated.

In a case where the envelope processing controller 190 determines that the second sheet S2 located upstream from the enclosing device 120 is located adjacent to the purge branching claw 11 as illustrated in FIG. 20, the second sheet S2 may be damaged if the purge branching claw 11 is rotated to eject the second sheet S2 to the purge ejection tray 50.

Accordingly, in this case, conveyance is reversed from downstream to upstream using a "reverse conveyance operation (reverse conveyance processing)" in which the conveyance object is conveyed in a direction (reverse conveyance direction) opposite to the normal conveyance direction. For example, the entry roller pair 101, the first intermediate conveying roller pair 103, the first conveying roller pair 111, and the enclosing roller pair 121 are reversed to convey the second sheet S2 in reverse to the upstream side of the first intermediate conveying roller pair 103. The reverse conveyance control is performed based on the detection signals from the conveyance sensors disposed between adjacent pairs of the conveying roller pairs. As a result, the second sheet S2 is temporarily conveyed in reverse until the second sheet S2 reaches the upstream side of the purge branching claw 11. Thereafter, the purge branching claw 11 is rotated to convey the second sheet S2 toward the purge conveyance passage 1113. Next, the second sheet S2 is ejected to the purge ejection tray 50.

As illustrated in FIG. 21, the second sheet S2 located upstream from the enclosing device 120 is located adjacent to the enclosing-and-ejection switching claw 13, or the second sheet S2 may be located at a position where the second sheet S2 cannot be purged and ejected unless the envelope E is conveyed in reverse because the envelope E stagnates on the downstream side in the enclosing device 120. In a case where the second sheet S2 is damaged if a configuration for switching conveyance passages, such as the enclosing-and-ejection switching claw 13, is operated first, the reverse conveyance is also performed when the purge ejection cannot be performed even if the conveyance object is conveyed downstream.

In the example of FIG. 21, the entry roller pair 101, the first intermediate conveying roller pair 103, the first conveying roller pair 111, and the enclosing roller pair 121 are rotated in reverse to convey the second sheet S2 in reverse to the upstream side of the first intermediate conveying roller pair 103. Thus, the second sheet S2 is temporarily conveyed in reverse until the second sheet S2 reaches the upstream side of the purge branching claw 11. Thereafter, the purge branching claw 11 is rotated to convey the second sheet S2 toward the purge conveyance passage 1113. Next, the second sheet S2 is ejected to the purge ejection tray 50.

As described above, in the envelope processing apparatus 100 according to the present embodiment, when the second sheet S2 is conveyed upstream from the enclosing device 120, the purge ejection can be performed. In addition, for example, in a case where the purge ejection tray 50 is not disposed or the purge ejection tray 50 is fully stacked with the conveyance objects that have already been ejected, the second sheet S may be conveyed to the post-processing apparatus 400 by the exit roller pair 102 with the purge branching claw 11 not rotated.

Third Embodiment

Figure 22:
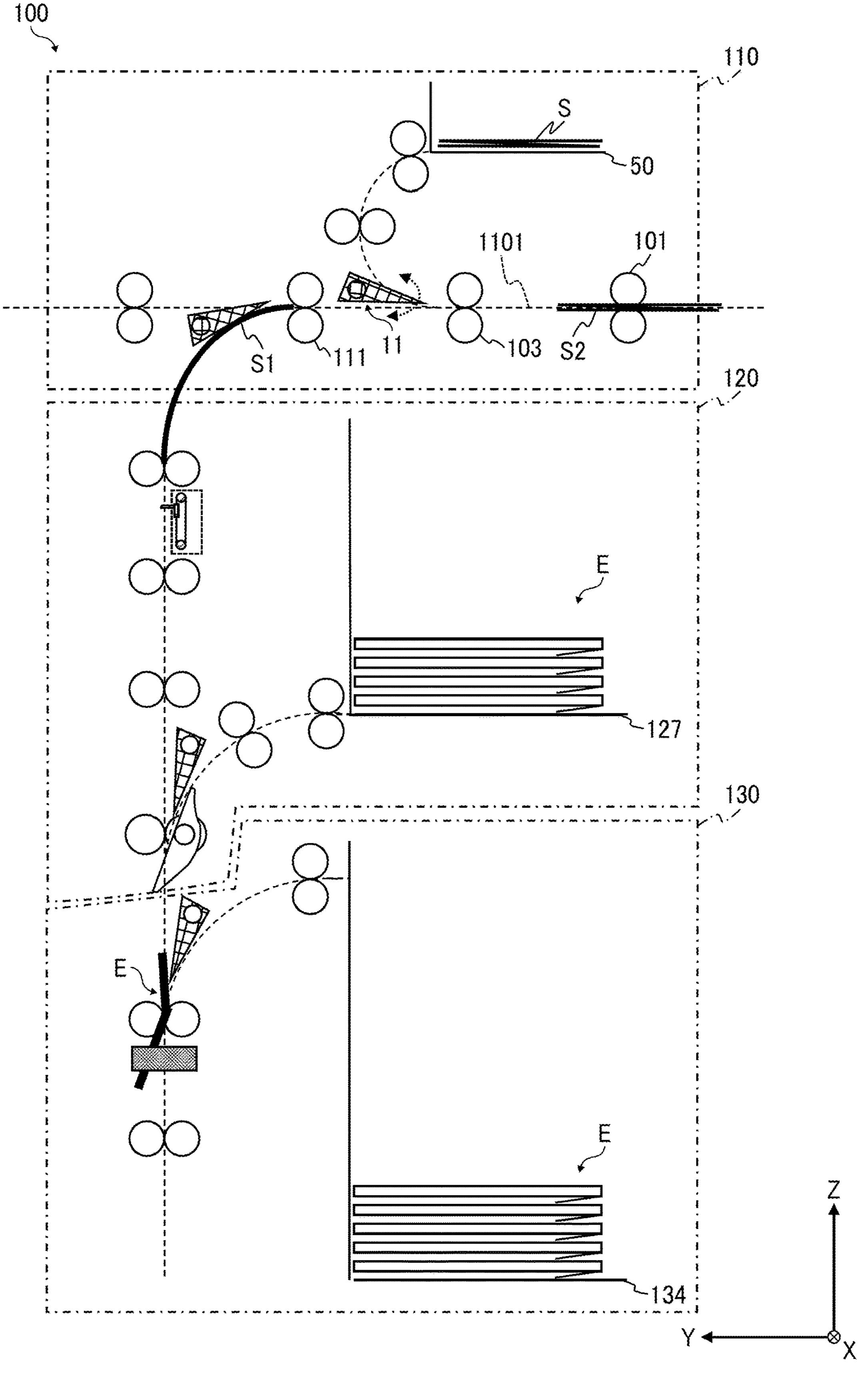
FIG. 22 is a diagram illustrating a step of the purge conveyance operation, subsequent to the state in FIG. 21.

Next, a description is given of a purge conveyance operation of the envelope processing apparatus 100 according to a third embodiment of the present disclosure. FIG. 22 illustrates an example of the purge operation in a case where, in particular, a plurality of sheets S are upstream from the enclosing device 120 in the conveyance passage before the enclosing processing and an envelope E before and after the enclosing processing is turned to the abnormal conveyance state in the downstream side from the enclosing device 120 during conveyance. Even in a situation as illustrated in FIG. 22, the purge ejection processing can be performed by appropriately rotating conveying roller pairs in reverse and distinguishing the position to which each sheet S is conveyed in reverse.

As illustrated in FIG. 22, a case is assumed in which the second sheet S2 is between the entry roller pair 101 and the first intermediate conveying roller pair 103, and a first sheet S1 is between the first conveying roller pair 111, the enclosing roller pair 121, the first vertical conveying roller pair 122, and the second vertical conveying roller pair 123. In this case, the purge ejection processing is sequentially performed from a sheet S more upstream among the sheets S adjacent to the components such as the purge branching claw 11 and the enclosing-and-ejection switching claw 13 which may damage the sheet S by rotation.

First, the purge ejection processing is performed on the second sheet S2. Since the second sheet S2 is located upstream from the purge branching claw 11, the purge branching claw 11 is rotated to eject the second sheet S2 to the purge ejection tray 50. The first conveyance passage 1101 from the entry roller pair 101 to the first conveying roller pair 111 empties with this processing. Accordingly, similarly to the second embodiment (described in FIG. 21), the first sheet S1 can be conveyed in reverse toward the upstream side for the purge operation.

Even if the second sheet S2 is located at the position illustrated in FIG. 22 and the trailing end of the first sheet S1 is located between the first intermediate conveying roller pair 103 and the first conveying roller pair 111, the first sheet S1 is once conveyed to a position where the purge branching claw 11 does not contact the trailing end of the first sheet S1 after the first sheet S1 has passed through the first conveying roller pair 111. Thereafter, the purge branching claw 11 is rotated to the position illustrated in FIG. 20 to convey the first sheet S1 in reverse to the upstream side of the first intermediate conveying roller pair 103. Then, the purge branching claw 11 is rotated to convey the second sheet S2 toward the purge conveyance passage 1113. As a result, the second sheet S2 is ejected to the purge ejection tray 50.

The purge ejection processing according to the present embodiment is performed on a sheet S having a conveyance length detectable by a conveyance sensor and having a length such that a trailing end can pass through the vicinity of the enclosing-and-ejection switching claw 13 when the position of the sheet S is moved.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An envelope processing apparatus configured to insert an enclosure into an envelope, the envelope processing apparatus comprising:

a first conveyor configured to convey the enclosure to an enclosing position;

a first ejector to which the envelope in which the enclosure is enclosed is to be ejected;

a second conveyor configured to:

convey the envelope to the enclosing position via an envelope conveyance passage extended in a substantially vertical and up-and-down direction; and convey the envelope in which the enclosure is inserted to the first ejector;

a second ejector separate from the first ejector, the second ejector to which the enclosure is to be ejected; and circuitry configured to control a conveyance operation of the first conveyor and the second conveyor, wherein, when at least one of the enclosure or the envelope is in an abnormal conveyance state in the first conveyor, the circuitry is configured to control the conveyance operation so that the enclosure being conveyed with the second conveyor is ejected to the first ejector, and wherein the second ejector is configured to perform a reverse conveyance operation such that the enclosure once ejected is returned to the first conveyor.

2. The envelope processing apparatus according to claim 1, wherein, when at least one of the enclosure or the envelope is in an abnormal conveyance state in at least one of the first conveyor or the second conveyor, the circuitry is configured to control the conveyance operation so that the enclosure and the envelope that are not a cause of the abnormal conveyance state are ejected to the first ejector or the second ejector.

3. The envelope processing apparatus according to claim 1, wherein, when at least one of the enclosure or the envelope is in an abnormal conveyance state in the second conveyor, the circuitry is configured to control the conveyance operation so that the enclosure being conveyed with the first conveyor is ejected to the second ejector.

4. The envelope processing apparatus according to claim 1, further comprising a sealer configured to seal the envelope in which the enclosure is inserted.

5. An image forming system comprising:

an image forming apparatus configured to form an image onto a sheet-shaped medium; and the envelope processing apparatus according to claim 1.

6. An envelope processing apparatus configured to insert an enclosure into an envelope, the envelope processing apparatus comprising:

a first conveyor configured to convey the enclosure to an enclosing position;

a first ejector to which the envelope in which the enclosure is enclosed is to be ejected;

a second conveyor configured to:

convey the envelope to the enclosing position via an envelope conveyance passage extended in a substantially vertical and up-and-down direction; and convey the envelope in which the enclosure is inserted to the first ejector;

a second ejector separate from the first ejector, the second ejector to which the enclosure is to be ejected; and circuitry configured to control a conveyance operation of the first conveyor and the second conveyor, wherein the first conveyor and the second conveyor are configured to convey the enclosure and the envelope in a normal conveyance direction in a normal conveyance state and a reverse conveyance direction in an abnormal conveyance state, the abnormal conveyance direction opposite to the normal conveyance direction, and wherein the circuitry is configured to control switching the conveyance operation of the first conveyor and the second conveyor between a conveyance operation in which the first conveyor and the second conveyor convey the enclosure and the envelope in the normal conveyance direction and a conveyance operation in which the first conveyor and the second conveyor convey the enclosure and the envelope in the reverse conveyance direction, depending on a position of occurrence of the abnormal conveyance state.

7. The envelope processing apparatus according to claim 6, wherein, when at least one of the enclosure or the envelope is in an abnormal conveyance state in at least one of the first conveyor or the second conveyor, the circuitry is configured to control the conveyance operation so that the enclosure and the envelope that are not a cause of the abnormal conveyance state are ejected to the first ejector or the second ejector.

8. The envelope processing apparatus according to claim 6, wherein, when at least one of the enclosure or the envelope is in an abnormal conveyance state in the second conveyor, the circuitry is configured to control the conveyance operation so that the enclosure being conveyed with the first conveyor is ejected to the second ejector.

9. The envelope processing apparatus according to claim 6, wherein, when at least one of the enclosure or the envelope is in an abnormal conveyance state in the first conveyor, the circuitry is configured to control the conveyance operation so that the enclosure being conveyed with the second conveyor is ejected to the first ejector.

10. The envelope processing apparatus according to claim 6, further comprising a sealer configured to seal the envelope in which the enclosure is inserted.

11. An image forming system comprising:

an image forming apparatus configured to form an image onto a sheet-shaped medium; and the envelope processing apparatus according to claim 6.

12. An envelope processing apparatus configured to insert an enclosure into an envelope, the envelope processing apparatus comprising:

a first conveyor configured to convey the enclosure;

a second conveyor disposed below the first conveyor, the second conveyor configured to convey the enclosure and the envelope; and circuitry configured to control a conveyance operation of the first conveyor and the second conveyor, wherein the first conveyor includes a first passage configured to convey the enclosure in a substantially horizontal direction, at least one pair of first rollers disposed in the first passage, an enclosure ejection tray, a second passage branching from the first passage and connected to the enclosure ejection tray, and at least one pair of second rollers disposed in the second passage, the second conveyor includes a third passage configured to convey the enclosure and the envelope in a substantially vertical and up-and-down direction, at least one pair of third rollers disposed in the third passage, an envelope ejection tray, a fourth passage branching from the third passage and connected to the envelope ejection tray, and at least one pair of fourth rollers disposed in the fourth passage, and in response to detecting an abnormal state of at least one of the enclosure or the envelope in at least one of the first passage or the third passage, the circuitry is further configured to control the at least one pair of first rollers and the at least one pair of second rollers to convey the enclosure that is not in the abnormal state to the enclosure ejection tray, and control the at least one pair of third rollers and the at least one pair of fourth rollers to convey the envelope that is not in the abnormal state to the envelope ejection tray.

* * * * *